(12) United States Patent
Federici

(10) Patent No.: US 9,268,824 B1
(45) Date of Patent: Feb. 23, 2016

(54) SEARCH ENTITY TRANSITION MATRIX AND APPLICATIONS OF THE TRANSITION MATRIX

(71) Applicant: Google Inc., Mountain View, CA (US)

(72) Inventor: Diego Federici, Lombardy (IT)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 13/965,570

(22) Filed: Aug. 13, 2013

Related U.S. Application Data

(63) Continuation of application No. 12/632,409, filed on Dec. 7, 2009, now Pat. No. 8,515,975.

(51) Int. Cl.
  *G06F 17/30* (2006.01)

(52) U.S. Cl.
  CPC .............................. *G06F 17/30554* (2013.01)

(58) Field of Classification Search
  None
  See application file for complete search history.

(56) References Cited

U.S. PATENT DOCUMENTS

| | | |
|---|---|---|
| 5,265,065 A | 11/1993 | Turtle |
| 6,006,222 A | 12/1999 | Culliss |
| 6,014,665 A | 1/2000 | Culliss |
| 6,078,916 A | 6/2000 | Culliss |
| 6,182,068 B1 | 1/2001 | Culliss |
| 6,327,590 B1 | 12/2001 | Chidlovskii et al. |
| 6,539,377 B1 | 3/2003 | Culliss |
| 6,671,681 B1 | 12/2003 | Emens et al. |
| 6,816,850 B2 | 11/2004 | Culliss |
| 7,222,127 B1 | 5/2007 | Bem et al. |
| 7,231,399 B1 | 6/2007 | Bem et al. |
| 7,516,146 B2 | 4/2009 | Robertson et al. |
| 8,423,538 B1 * | 4/2013 | Sadikov et al. ............... 707/722 |
| 2003/0167252 A1 | 9/2003 | Odom et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0210383 A1 | 9/2005 | Cucerzan et al. |
| 2005/0256848 A1 | 11/2005 | Alpert et al. |
| 2007/0214131 A1 | 9/2007 | Cucerzan et al. |
| 2007/0226198 A1 | 9/2007 | Kapur |

(Continued)

OTHER PUBLICATIONS

Agichtein, et al; Improving Web Search Ranking by Incorporating User Behavior Information; Aug. 2006; Proceedings of the Twenty-Ninth Annual International ACM SIGIR Conference on Research and Development in Information Retrieval, p. 19-26.

(Continued)

*Primary Examiner* — Syed Hasan
(74) *Attorney, Agent, or Firm* — Fish & Richardson P.C.

(57) ABSTRACT

Methods, systems, and apparatus, including computer programs encoded on computer storage media, for using search entity transition probabilities. In some implementations, data identifying entities and transition probabilities between entities is stored in a computer readable medium. Each transition probability represents a strength of a relationship between a pair of entities as they are related in search history data. In some implementations, an increase in popularity for a query is identified and a different query is identified as temporally related to the query. Scoring data for documents responsive to the different query is modified to favor newer documents. In other implementations, data identifying a first session as spam is received, and a spam score is calculated for either a second session of queries or a single query using transition probabilities. The second session (or single query) is identified as spam from the spam score.

16 Claims, 21 Drawing Sheets

(56) References Cited

U.S. PATENT DOCUMENTS

| | | | |
|---|---|---|---|
| 2009/0307049 A1* | 12/2009 | Elliott et al. | 705/10 |
| 2010/0082605 A1 | 4/2010 | Dupret et al. | |
| 2010/0125572 A1* | 5/2010 | Poblete et al. | 707/722 |
| 2011/0035397 A1 | 2/2011 | Joshi et al. | |

OTHER PUBLICATIONS

Agichtein, et al; Learning User Interaction Models for Predicting Web Search Result Performances; Aug. 2006; Proceedings of the Twenty-Ninth Annual International ACM SIGIR Conference on Research and Development in Information Retrieval, p. 3-10.

Boldi, et al.; The Query-flow Graph: Model and Applications; Oct. 2008; CKIM '08, Oct. 26-30, Napaya Valley, California, USA, p. 609-617.

Boyan et al.; A Machine Learning Architecture for Optimizing Web Search Engines; Aug. 1996;.Internet-based information systems-Workshop Technical Report-American Association for Artificial Intelligence, p. 1-8.

Craswell, et al.; Randon Walks on the Click Graph; Jul. 2007; SIGIR '07, Amsterdam, the Netherlands, 8 pages.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Joachims; *Optimizing search engines using clickthrough data*; 2002; Proceedings of the ACM SIGKDD International Conference on Knowledge Discovery and Data Mining, p. 133-142.

Joachims T. Evaluating retrieval performance using clickthrough data. Proceedings of the SIGIR Workshop on Mathematical/Formal Methods in Information Retrieval; Aug. 12-15, 2002; Tampere, Finland; 2002.

Chein et al., Semantic Similarity between search engine queries using temporal correlation, 2005, In Proceedings of the 14th international conference on World Wide Web (WWW '05). ACM, New York, NY, USA.

Joachims, "Evaluating Search Engines Using Clickthrough Data", Cornell University, Department of Computer Science, Draft, Feb. 19, 2002, 13 pages.

Jansen et al., "An Analysis of Web Documents Retrieved and Viewed", School of Information Sciences and Technology, The Pennyslvania State University, the 4th International Conference on Internet Computing, Las Vegas, Nevada, pp. 65-69, Jun. 23-26, 2003, 5 pages.

\* cited by examiner

Search History Data *300*

Session A
*304*

Time A: Query A
 Document A; URL A; 12.3 seconds
 Document B; URL B; 14.5 seconds  } *308*
 Document C; URL C; 02.0 seconds Time B: Query B *302*     ⌒*310*
 Document D; URL D; 13.5 seconds
 Document E; URL E; 04.2 seconds
 Document F; URL F; 12.2 seconds Session B
*306*

Time A: Query C
 Document G; URL G; 09.2 seconds
 Document H; URL H; 24.4 seconds
 Document I; URL I; 18.1 seconds Time D: Query A
 Document A; URL A; 14.3 seconds
 Document K; URL K; 12.4 seconds
 Document L; URL L; 02.2 seconds Time E: Query E
 Document M; URL M; 18.7 seconds
 Document N; URL N; 06.7 seconds
 Document O; URL O; 15.0 seconds

FIG. 3

SEARCH ENTITY TRANSITION MATRIX AND APPLICATIONS OF THE TRANSITION MATRIX

CROSS-REFERENCE TO RELATED APPLICATIONS

This application is a continuation application of and claims priority to U.S. application Ser. No. 12/632,409, filed on Dec. 7, 2009. The disclosure of the foregoing application is incorporated here by reference.

BACKGROUND

This specification relates to identifying and using relationships between search entities.

Internet search engines provide information about Internet accessible documents (e.g., Web pages, images, text documents, multimedia content) that are responsive to a user's search query and present information about the resources in a manner that is useful to the user. Internet search engines return a set of search results (e.g., as a ranked list of results) in response to a user submitted query. A search result includes, for example, a Uniform Resource Locator (URL) and a snippet of information from a corresponding document.

Each time a user submits a search query and receives results, several search entities are typically involved, including, for example, the query the user submits, documents that are responsive to the query, the search session during which the user submits the query, the time at which the query is submitted, and advertisements presented in response to the query.

SUMMARY

This specification describes technologies relating to relationships between search entities.

In general, one aspect of the subject matter described in this specification can be embodied an article of manufacture, including a computer readable medium and information stored in the computer readable medium including data identifying entities, where the entities include entities having a type of a query, entities having a type of a document responsive to queries, and entities having a type of: a session of queries, a time at which a query is submitted, an anchor in a document, or a domain associated with a document. The information stored in the computer readable medium further includes transition probabilities for first pairs of entities, where each transition probability represents a strength of a relationship between a first pair of entities having types of query and document as they are related in search history data. The information further includes transition probabilities for second pairs of entities, where each transition probability represents a strength of a relationship between a second pair of entities having types of document and a type other than query as they are related in the search history data.

This and other embodiments can each optionally include one or more of the following features. The transition probability from a query to a document can be based on a quality of result score for the document as a search result for the query and quality of results scores for documents in search history data as search results for the query. The transition probability from a document to a query can be based on a quality of result score for the document as a search result for the query and quality of results scores for the document as a search result for queries in search history data. The transition probability from a first document to a first session can be based on the number of documents viewed during the first session, and the transition probability from a second session to a second document can be based on a number of sessions where the second document was viewed.

The article of manufacture can further include transition probabilities between anchors and documents, where the transition probability between an anchor and a document represents a strength of a relationship between the anchor and the document, and the strength of the relationship is determined based on whether the anchor is included in the document. The article of manufacture can further include transition probabilities between anchors and documents, where the transition probability between an anchor and a document represents a strength of a relationship between the anchor and the document, and the strength of the relationship is determined based on whether the anchor links to the document.

In general, another aspect of the subject matter described in this specification can be embodied in methods that include the actions of identifying an increase in popularity for a first query. A different second query can be identified as temporally related to the first query using transition probabilities from the first query to a time of year and transition probabilities from the time of year to the second query, where the transition probability from the first query to the time of year estimates a strength of a relationship between the first query and the time of year based on whether the first query had an increase in popularity at the time of year and how often the first query had an increase in popularity. Scoring data for one or more documents responsive to the second query can be modified to favor newer documents responsive to the first query. Other embodiments of this aspect include corresponding systems, apparatus, and computer programs recorded on computer storage devices, each configured to perform the operations of the methods.

These and other embodiments can each optionally include one or more of the following features.

The transition probability from the time of year to the second query can estimate a strength of a relationship between the time of year and the second query based on whether the second query had an increase in popularity at the time of year and how many other queries had an increase in popularity at the time of year. Modifying the scoring data to favor newer documents can include discounting an anchor score in the scoring data. The anchor score can be for the first document and can measure anchors to the first document. Modifying the scoring data to favor newer documents can include discounting a historical quality of result score in the scoring data, where the historical quality of result score is for the query and a document.

In general, another aspect of the subject matter described in this specification can be embodied in methods that include the actions of receiving data identifying a first session of queries as spam. A spam score is computed for a second session of queries using transition probabilities from the first session to one or more documents and transition probabilities from each of the one or more documents to the second session, where the respective transition probability from the first session to a respective document is an estimate of a strength of relationship between the first session and the respective document based on a number of sessions where the document was viewed. The second session is determined to be spam based on the invalidity spam score. Other embodiments of this aspect include corresponding systems, apparatus, and computer programs recorded on computer storage devices, each configured to perform the operations of the methods.

These and other embodiments can each optionally include one or more of the following features. The method can further include discounting a weight given to data for the second session in search history data when the data is used to generate a score estimating how responsive a document is to a query. The transition probability between a document and the second session can be based on the number of documents viewed during the second session.

In general, another aspect of the subject matter described in this specification can be embodied in methods that include the actions of receiving data identifying a first session as spam. A spam score is computed for a first query using a transition probability from the first session to the first query, where the transition probability from the first session to the first query is an estimate of a strength of a relationship between the first session and the first query based on the number of queries submitted in the first session. The first query is determined to be spam from the invalidity spam score. Other embodiments of this aspect include corresponding systems, apparatus, and computer programs recorded on computer storage devices, each configured to perform the operations of the methods.

These and other embodiments can each optionally include one or more of the following features. The method can further include updating an estimate of invalid spam queries in a population of queries to include data for the first query. The method can further include computing a spam score for a second session using a transition probability from the first query to the second session, and identifying the second session as invalid spam from the spam score. The method can further include obtaining search history data including an initial quality of results statistic for a document as a search result for the first query, generating a modified quality of result statistic for the document as a search result for the first query from the initial quality of result statistic and the invalidity spam score for the first query, and updating the search history data to include the modified quality of results statistic in place of the initial quality of result statistic. Generating the modified quality of results statistic can include scaling the initial quality of results statistic by a factor, where the factor is calculated by subtracting the invalidity spam score from a constant.

Particular embodiments of the subject matter described in this specification can be implemented so as to realize one or more of the following advantages. Relationships between various search entities, including queries, documents, domains, sessions, advertisements, and time can be identified. The strength of relationships can be measured using a metric obtained from direct relationship strengths (derived from data indicating user behavior, such as user search history data) and indirect relationship strengths (derived from the direct relationship strengths). The relationships can be used in a variety of ways. For example, the relationships can be used to propagate a property of one entity to other related entities. A relationship between a first entity that has insufficient support (e.g., not enough search history data) to associate a given property with the first entity and a second entity that does have sufficient support to associate the given property with the second entity can be identified, and the given property can be associated with the first entity with higher confidence. The relationships can be used to provide a query suggestion feature to a user, where queries related to queries submitted by a user are identified. The relationships can be used to more accurately rank search results responsive to a query. The relationships can be used to provide a vertical search feature, where documents related to a group of documents are identified. The vertical search feature can be used to augment a set of search results responsive to a query with additional documents related to the top-ranked documents that are responsive to the query. Scoring of long-tail documents (e.g., documents for which there is little search history and other scoring data that can be used to score the documents) can be improved by scoring documents based on anchors, text, queries, and other signals associated with related documents. Domains can be classified based on queries associated with documents in the domain, and similar domains can be clustered. Queries can be related based on times when they have an increase in popularity. Queries that are about to become popular can be identified, and fresh results can be favored for these queries. Queries and sessions can be identified as spam from a session known to be spam. The impact that spam sessions and spam queries have on scoring can be reduced.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3 illustrates an example representation of search history data.

Like reference numbers and designations in the various drawings indicate like elements.

DETAILED DESCRIPTION

Figure 1:
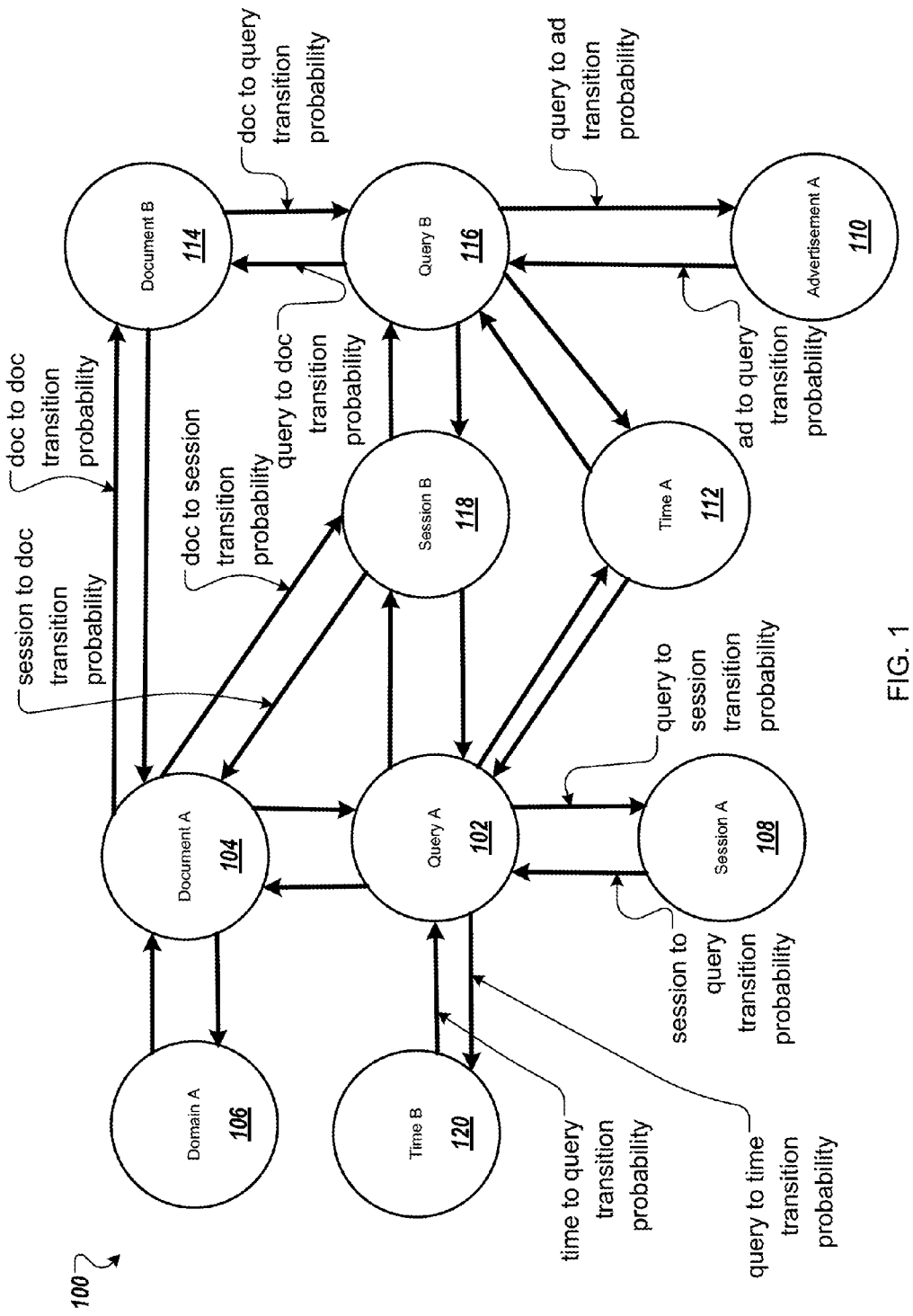
FIG. 1 is a graph showing an example of transition probabilities between search entities.

FIG. 1 is a graph 100 showing an example of transition probabilities between search entities. The nodes of the graph correspond to search entities, and the weighted edges between the nodes correspond to transition probabilities. Generally speaking, search entities are elements of a user's search experience. Examples of entities include queries of a corpus of documents (e.g., query A 102), documents in the corpus of documents (e.g., document A, 104), domains of documents (e.g., domain A 106) sessions of queries (e.g., session A 108), advertisements (e.g., advertisement A 110), and the time a query is submitted (e.g., time A 112). Examples of time include a specific period of minutes, a specific hour, a specific day, a specific month, a specific quarter, or a specific year. Other entities are also possible, for example, anchors in documents, or users.

The transition probabilities shown in FIG. 1 are first order transition probabilities that estimate a strength of relationship between a first entity and a second entity in the graph based, for example, on one or more of search history data and relationships between the entities outside of the search history data. Additional, higher order transition probabilities can be derived from the first order transition probabilities. Together, these first order and higher order transition probabilities can be used to determine an overall strength of a relationship between entities according to a Markov chain model. In general, a Markov chain is a model for evaluating a system where the likelihood of a given future state of the system depends only on the present state of the system and not past states of the system. Here, the entities are the states of the system, and the likelihood of a given future state measures a strength of a relationship between two entities.

A system, such as a search system or another system, can use different heuristics to calculate first order transition probabilities between different types of entities from different types of data, as described below. Once these first order transition probabilities are determined, they can be used to generate higher order transition probabilities through a series of multiplications.

Figure 2:
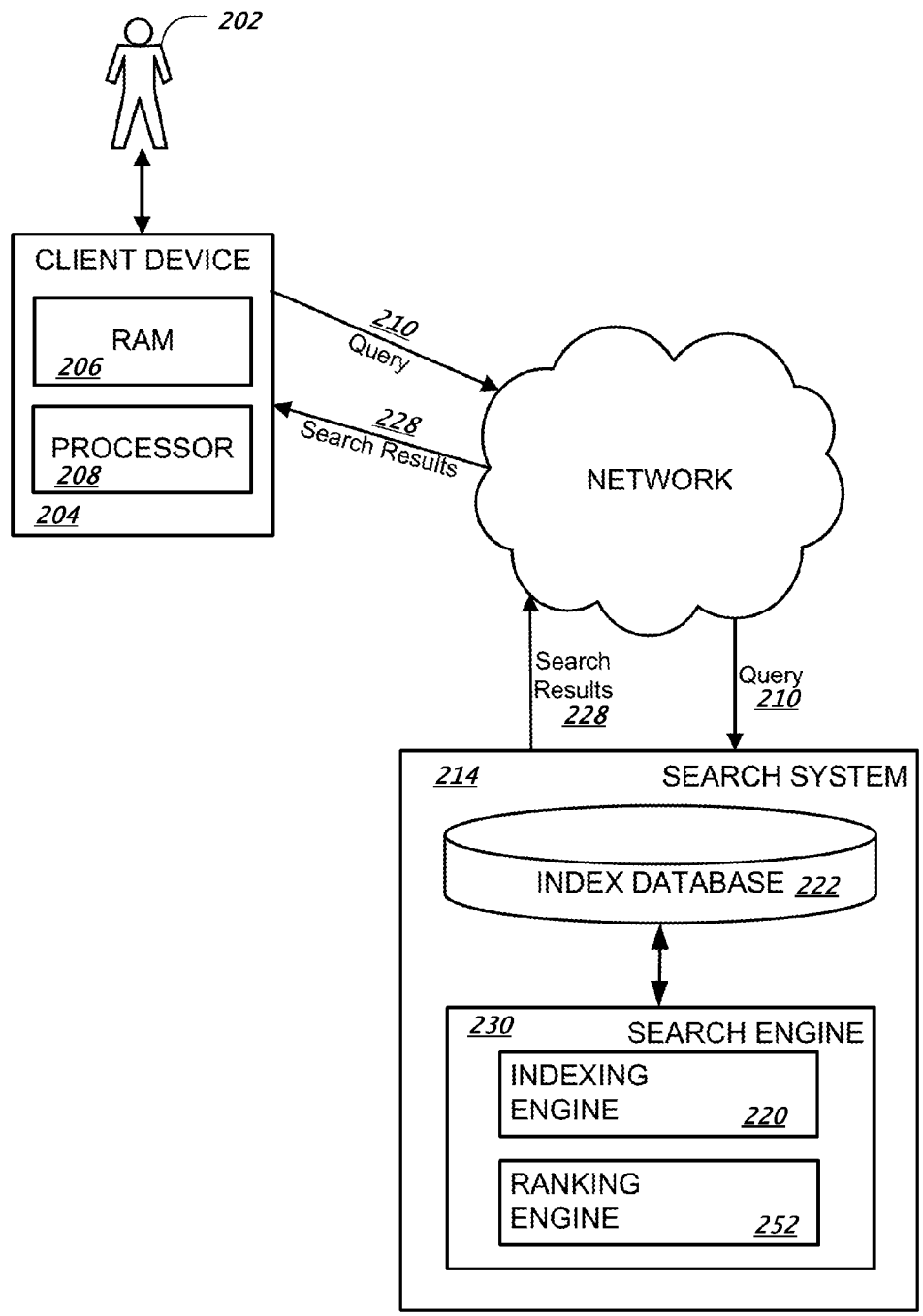
FIG. 2 illustrates an example search system for providing search results responsive to submitted queries.

FIG. 2 illustrates an example search system 214 for providing search results relevant to submitted queries as can be implemented in an internet, an intranet, or another client and server environment. The search system 214 is an example of an information retrieval system that can be used to generate search history data used to calculate first order transition probabilities.

A user 202 can interact with the search system 214 through a client device 204. For example, the client device 204 can be a computer (e.g., a personal computer, a mobile phone, etc.) coupled to the search system 214 through a wired or wireless local area network (LAN) or wide area network (WAN), e.g., the Internet. In some implementations, the search system 214 and the client device 204 are one machine. For example, a user can install a desktop search application on the client device 204. The client device 204 will generally include a random access memory (RAM) 206 and a processor 208.

A user 202 can submit a query 210 to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network. The search system 214 includes an index database 222 and a search engine 220. The search system 214 responds to the query 210 by generating search results 228, which are transmitted through the network to the client device 204 in a form that can be presented to the user 202 (e.g., as a search results web page to be displayed in a web browser running on the client device 204).

When the query 210 is received by the search engine 230, the search engine 230 identifies documents that match the query 210. The search engine 230 will generally include an indexing engine 220 that indexes documents (e.g., web pages, images, multimedia content, or news articles on the Internet) found in a corpus (e.g., a collection or repository of content), an index database 222 that stores the index information, and a ranking engine 252 (or other software) to rank the documents that match the query 210. The indexing and ranking of the documents can be performed, for example, using conventional techniques. The search engine 230 can transmit the search results 228 through the network to the client device 204 for presentation to the user 202.

FIG. 3 illustrates an example representation of search history data 300. The search history data is collected as a user interacts with a search engine by submitting one or more queries (e.g., query B 302), clicking (e.g., selecting with a mouse or other input device, including an input device accepting touch, voice, or gesture input), on one or more search results corresponding to documents (e.g., documents D, E, and F) presented on a search results page by the search engine in response to the query, viewing the documents, and returning to the search results page. The search history data can include the time a query is submitted (e.g., time B), what documents a user clicked on, and how long the user dwelled on the documents (e.g., entry 310). How long the user viewed the document is referred to as "click data". For example, a longer time spent dwelling on a document, termed a "long click", can indicate that a user found the document to be relevant to the query. A brief period viewing a document, termed a "short click", can be interpreted as a lack of document relevance. While the search history data shown in FIG. 3 is for a single user, a search history can include data for multiple users.

The search history can be divided into segments corresponding to different sessions (e.g., Session A 304 and Session B 306). In general, a session is a period during which a user submits queries. A session can be measured in a number of ways including, for example, by a specified period of time (for example, thirty minutes), by a specified number of queries (for example, fifteen queries), until a specified period of inactivity (for example, ten minutes without submitting a query), while a user is logged-in to a system, or while a user submits queries that relate to similar topics.

The search history data includes information about various search entities. For example, the data 308 indicates that during Session A and at Time A, Query A was issued, and the user viewed Document A for 12.3 seconds, Document B for 14.5 seconds, and Document C for 2.0 seconds.

In some implementations, the search history data is stored in an aggregated format. For example, the search history data can include aggregated click data such as a count of each click type (e.g., long, short) for a particular query and document combination.

Returning to FIG. 1, the system can calculate various first order transition probabilities from the search history data. In general, the system uses an entity type specific transfer function ($P_{tran}$) to calculate the transition probability between two entities. For example, the system can calculate a document-to-query transition probability from the search history data. In general, a document-to-query transition probability estimates a strength of a relationship between a document and a query based on how likely users viewing the document are to find the document to be a responsive search result for the query. For example, the system can calculate a document-to-query transition probability, such as the transition from document B 114 to query B 116 by dividing a quality of result statistic for document B 114 and query B 116 by the sum of quality of result statistics for document B 114 and all of the queries in the search history data, e.g.:

$$P_{tran}(d_B, q_B) = \frac{qor(d_B, q_B)}{\sum_{q_i \in S_q} qor(d_B, q_i)},$$

where $P_{tran}(d_B, q_B)$ is the transition probability from document B 120 to query B 118, qor(d, q) is the quality of result statistic for document d and query q, and $S_q$ is the set of queries in the search history data.

In general, the quality of result statistic estimates how responsive users found a given document to be as a search result for a given query. In some implementations, the system generates the quality of result statistic for a given document as a search result for a given query from the click data for the document and the query in the search history data. For example, a quality of result statistic can be a weighted sum of the count of long clicks for a given document when it is presented in response to a given query (where each click is weighted by the time spent viewing the document) divided by the total number of clicks for the document when it is presented in response to the query or divided by the total number of clicks for all documents responsive to the query when they are presented in response to the query, a weighted sum of all of the clicks for a document when it is presented in response to a query (where each click is weighted by the time spent viewing the document) divided by the total number of clicks for all documents responsive to the query when they are presented in response to the query, or a sum of all of the clicks for the document when it is presented in response to the query divided by the total number of clicks for all documents responsive to the query when they are presented in response to the query. The system can also generate other quality of results statistics; for example, the quality of result statistic can be generated from click data for the document, the query, and queries similar to the query. Two queries can be similar when they differ only in small differences in spelling, small differences in word order, the use of abbreviations, the use of synonyms, or the use of stop words (e.g., known terms that do not contribute to the topicality of the query such as "a" or "the"). Other common measures of similarity can also be used, for example, the edit distance for the two queries.

In some implementations, the system makes various modifications to the transfer function described above and the transfer functions described below. For example, in some implementations, the system smooths the data by adding smoothing factors to the numerator and denominator of the equation, e.g.:

$$P_{tran}(d_B, q_B) = \frac{qor(d_B, q_B) + s}{\left(\sum_{q_i \in S_q} qor(d_B, q_i)\right) + S},$$

where s and S are smoothing factors (e.g., positive integers) that are determined, for example, empirically.

As another example, in some implementations, the system adds an exponent to the numerator and to the denominator, for example, to massage the data, essentially increasing or decreasing the impact of popularity when the direct transition probabilities are used to generate indirect transition probabilities. The exponents allow or disallow the emergence of clusters of entities. In general, a cluster occurs when a subset of entities have high transition probabilities to each other. The exponents can either decrease the impact of weak relationships (and thus promote clustering) or increase the impact of weak relationships (and thus result in less clustering). For example, $P_{tran}$ can be calculated as:

$$P_{tran}(d_B, q_B) = \frac{(qor(d_B, q_B))^k}{\left(\sum_{q_i \in S_q} qor(d_B, q_i)\right)^m},$$

where k and m are empirically determined and can be the same, or different, numbers.

As yet another example, in some implementations, the system uses an equalitarian version of the transfer function to prevent more popular entities (e.g., common queries) from overtaking less popular queries (e.g., less common queries). Less popular entities can be overtaken by more popular entities, for example, when the more popular queries have a strong cluster of related entities that can overpower other weak relationships of the less popular entity. For example, the system can use a transfer function like the following:

$$P_{tran}(d_B, q_B) = \frac{qor(d_B, q_B)}{\sum_{q_i \in S_q} step(qor(d_B, q_i))},$$

where step(x) is a step function having a value, for example, of 0 if x<=0 and 1 otherwise, and $P_{tran}(d_B, q_B)$ is 0 if $qor(d_B, q_B)$ is 0.

Other modifications to the transfer function are also possible.

The system can calculate a query-to-document transition probability from the search history data. In general, a query-to-document transition probability estimates a strength of a relationship between a query and a document based on how likely users issuing the query are to find the document to be a responsive search result for the query. In some implementations, a query-to-document transition probability, such as the transition from query B 116 to document B 114, is calculated by dividing a quality of result statistic for document B 114 and query B 116 by the sum of quality of result statistics for query B and all documents in the search history data, e.g.:

$$P_{tran}(q_B, d_B) = \frac{qor(d_B, q_B)}{\sum_{d_i \in S_d} qor(d_i, q_B)},$$

where $P_{tran}(q_B, d_B)$ is the transition probability from query B 116 to document B 114, qor(d, q) is the quality of result statistic for document d and query q, and $S_d$ is the set of documents in the scoring model. Other ways of determining the query-to-document transition probability are also possible.

In some implementations, the system only includes quality of result statistics above a certain threshold in the probability calculation. The threshold can be determined, for example, empirically.

The system can calculate a document-to-session transition probability from the search history data. In general, a document-to-session transition probability estimates a strength of a relationship between a document and a session based on whether the document is viewed during the session, and optionally how many documents are viewed during the session. In some implementations, the system calculates a document-to-session transition probability, for example, between document A 104 and session B 118, by analyzing whether document A 104 was clicked on during session B 118. If not, the document-to-session probability is 0. If document A 104 was clicked on, the system can calculate the document-to-session probability by dividing 1 by the number of documents that were clicked on during the session B 112, e.g.:

$$P_{tran}(d_A, s_B) = \frac{inSession(d_A, s_B)}{\sum_{d_i \in S_d} inSession(d_i, s_B)},$$

where $P_{tran}(d_A, s_B)$ is the transition probability from document A 104 to session B 118, inSession(d, s) has a value of 1 if document d was clicked on in session s, and otherwise is 0, and $S_d$ is the set of documents in the search history data. In further implementations, inSession(d, s) has a value of 1 if the document had a long-click in session s, and otherwise has a value of 0. Other methods of calculating a document-to-session transition probability can be used. For example, the transition probability can be 1 if the document was clicked on during the session, and 0 otherwise.

The system can similarly calculate a session-to-document transition probability from the search history data. In general, a session-to-document transition probability estimates a strength of a relationship between a session and a document based on whether the document is viewed during the session, and optionally how many sessions the document is viewed in. For example, the a document-to-session transition probability, such as the session-to-document transition probability between session B 118 and document A 104 is 0 if the search history data indicates that document A 104 was not clicked on during session B 118, and otherwise is 1 divided by the number of the sessions where document A 104 was viewed, e.g.:

$$P_{tran}(s_B, d_A) = \frac{inSession(d_A, s_B)}{\sum_{s_i \in S_s} inSession(d_A, s_i)},$$

where $P_{tran}(s_B, d_A)$ is the transition probability from session B 118 to query A 104, inSession(d, s) has a value of 1 if document D was viewed in session s, and otherwise is 0, and $S_s$ is the set of sessions in the search history data. In further implementations, inSession(d, s) has a value of 1 if the document had a long-click in session s, and otherwise has a value of 0. Other methods of calculating a session-to-document transition probability can be used. For example, the transition probability can be 1 if the document was viewed during the session, and 0 otherwise.

The system can also calculate query-to-session and session-to-query transition probabilities from the search history data. In general, a query-to-session transition probability estimates a strength of a relationship between a query and a session based on whether the query was submitted during the session and optionally how many queries were submitted during the session. A session-to-query transition probability estimates a strength of a relationship between a session and a query based on whether the query is submitted during the session, and optionally how many sessions the query is submitted in. In some implementations, the query-to-session transition probability, such as the transition probability from query A 102 to session A 108, is 0 if the query A was not submitted in session A, and otherwise is 1 divided by the number of queries submitted during the session, e.g.:

$$P_{tran}(q_A, s_A) = \frac{inSession(q_A, s_A)}{\sum_{q_i \in S_q} inSession(q_i, s_A)},$$

where $P_{tran}(q_A, s_A)$ is the transition probability from query A 102 to session B 108, inSession(q, s) has a value of 1 if query q was submitted in session s, and otherwise is 0, and $S_q$ is the set of queries in the search history data. The system can alternatively use other methods of calculating a query-to-session transition probability. For example, the transition probability can be 1 if the query was submitted during the session, and 0 otherwise.

In some implementations, the session-to-query transition probability, for example, from session A 108 to query A 102 is 0 if the query A was not submitted in session A, and otherwise is 1 divided by the number of sessions in which the query was submitted, e.g.:

$$P_{tran}(s_A, q_A) = \frac{inSession(q_A, s_A)}{\sum_{s_i \in S_s} inSession(q_A, s_i)},$$

where $P_{tran}(s_A, q_A)$ is the transition probability from session A 108 to query A 102, inSession(q, s) has a value of 1 if query q was submitted in session s, and otherwise is 0, and $S_s$ is the set of sessions in the search history data. Other methods of calculating a session-to-query transition probability can be used. For example, the transition probability can be 1 if the query was submitted during the session, and 0 otherwise. In some implementations, the system calculates the transition probability to or from the query and queries that are similar to the query rather than just the transition probability to or from just the query itself.

The system can calculate a query-to-time transition probability from the search history data. In general, a query-to-time transition probability measures a strength of a relationship between a given query and a given time based on whether the given query had an increase in popularity at the given time, and optionally, how often the given query had increases in popularity. In some implementations, the transition probability from query A 102 and time B 120 is calculated from the search history data by determining whether query A 102 has a significant increase in popularity at time B 120. If not, then the query-to-time transition probability is 0. If query A does have a significant increase in popularity at time B, then the system can calculate the query-to-time transition by dividing 1 by the number of times the query had a significant increase in popularity, e.g.:

$$P_{tran}(q_A, t_B) = \frac{\text{peak}(q_A, t_B)}{\sum_{t_i \in S_t} \text{peak}(q_A, t_i)},$$

where $P_{tran}(q_A, t_B)$ is the transition probability from query A 102 to time B 120, peak(q, t) has a value of 1 if the query q had a significant increase in popularity at time t, and otherwise is 0, and $S_t$ is the set of times in the search history data.

In general, the system can determine whether a given query had a significant increase in popularity at a given time by analyzing a popularity measure for the query over time. The popularity measure can be, for example, the number of times the query is submitted during a given period of time divided by the total number of queries submitted during the period. If the change in popularity measure from one time period to the next changes more than a threshold, then the query had a significant increase in popularity during the time period where the change was observed. The threshold can be determined empirically and can be, for example, an absolute amount, a percentage of the popularity measure for the first period, or a percentage of the popularity measure for the time period where the change was observed.

In some implementations, the transition probability from a query to a time is further based on the geographic location from where the query was submitted, for example, to identify whether there has been a significant increase in popularity for the query from a certain geographic location at a certain time. For example, the popularity measure can be the number of times the query is submitted from a given geographic location divided by the total number of queries submitted from that geographic location. Examples of geographic location include, for example, continents, countries, states, and cities.

The system can similarly calculate a time-to-query transition probability from the search history data. In general, a time-to-query transition probability estimates a strength of relationship from a time and a query based on whether the query had an increase in popularity at the time, and optionally, how many other queries had an increase in popularity at the time. In some implementations, the transition probability from time B 120 and time A 102 is calculated from the search history data by determining whether query A 102 has a significant increase in popularity at time B 120. If not, then the query-to-time transition probability is 0. If query A does have a significant increase in popularity at time B 120, then the query-to-time transition is 1 divided by the number of queries having a significant increase in popularity at time A 102, e.g.:

$$P_{tran}(t_B, q_A) = \frac{\text{peak}(q_A, t_B)}{\sum_{q_i \in S_q} \text{peak}(q_i, t_B)},$$

where $P_{tran}(t_B, q_A)$ is the transition probability from time B 120 to query A 102, peak(q, t) has a value of 1 if the query q had a significant increase in popularity at time t, and otherwise is 0, and $S_q$ is the set of queries in the search history data. In some implementations, the transition probability from a time to a query is further based on the location where the query was issued, for example, to identify whether there has been a significant increase in popularity for the query from a certain location at a certain time.

The system can also calculate transition probabilities from data in addition to the search history data, for example, from document data. In some implementations, the system calculates a document-to-document transition probability, for example, from document A 104 to document B 114 based on whether document A 104 has an anchor pointing to document B 114. This document-to-document transition probability estimates a strength of relationship for the documents from their anchors. For example, the transition probability can be calculated using the following equations:

$$P_{tran}(d_A, d_B) = \frac{\text{Anchor}(d_A, d_B)}{\sum_{d_i \in S_d} \text{Anchor}(d_A, d_i)},$$

where Anchor($d_i$, $d_j$) is the number of anchors from $d_i$ to $d_j$. In some implementations, the anchors are filtered based on their text and Anchor($d_i$, $d_j$) is defined as follows:

$$\text{Anchor}(d_i, d_j) = \frac{AnchorTextSimilarToDocumentQuery(A_{d_i,d_j}, Q_{d_i})}{\sum_{A_{d_i,d_x} \in S_A} AnchorTextSimilarToDocumentQuery(A_{d_i,d_x}, Q_{d_i})},$$

where $S_A$ is the set of outbound anchors from document $d_i$, AnchorTextSimilarToDocumentQuery($A_{di, dj}$, $Q_{di}$) measures whether an anchor $A_{di, dj}$ from document $d_i$ to document $d_j$ includes anchor text that is similar to at least one query in $Q_{di}$, and $Q_{di}$ is the set of queries having a transition probability to document $d_i$ that exceeds a given threshold. The threshold can be empirically determined or can be based, for example, on the average transition probability from queries to documents. The similarity between anchor text and query text is determined based on textual similarity (e.g., the texts are similar when the edit distance between the anchor text and the query text is small), based on semantic similarity (e.g., the texts are similar when the anchor text and the query text have the same meaning), or based on both textual and semantic similarity. In some implementations, semantic similarity is determined, for example, based on transition probabilities from queries for the anchor text to queries for the query text, and vice versa. For example, if the transition probability from a query for the anchor text to a query for the query text exceeds a threshold, and the transition probability from a query for the anchor text to a query for the query text exceeds a threshold, then the anchor text and the query text can be determined to be semantically similar.

In some implementations, AnchorTextSimilarToDocumentQuery($A_{di, dj}$, $Q_{di}$) is 1 if an anchor with similar text exists, and is 0 otherwise. In alternative implementations, AnchorTextSimilarToDocumentQuery($A_{di, dj}$, $Q_{di}$) is proportional to the transition probabilities from queries having a similarity to the anchor text to the document $d_i$. For example, in some implementations:

$$AnchorTextSimilarToDocumentQuery(A_{d_i,d_j}, Q_{d_i}) = \sum_{q_y \in S_{qs}} (q_y \times TM(d_i, q_y)),$$

where $S_{qs}$ is the set of queries in $Q_{di}$ having text similar to the text of an anchor from $d_i$ to $d_j$, and TM($d_i$, $q_y$) is a transition probability from document $d_i$ to $q_y$.

The system can calculate document-to-domain transition probabilities and domain-to-document transition probabilities from relationships between documents and domains that are external to the search history data. The document-to-domain transition probability measures whether a given document is in a given domain. In some implementations, the document-to-domain transition probability, such as the transition probability from document A 104 to domain A 106, is 0 if the document is not in the domain, and 1 if the document is in the domain. Heuristics can be used to resolve permanent redirects during aggregation and avoid aggregation over hosting domains such as blogspot.com. For example, the system can look at domain registration to determine who is associated with certain documents and certain domains, and can receive feedback from human evaluators on documents have permanent redirects and what domains are hosting domains. Other heuristics for resolving permanent redirects and avoiding aggregation over hosting domains can also be used.

A domain-to-document transition probability measures the strength of a relationship between a given domain and a given document, for example, based on how important the document is to the domain (e.g., whether the document is in the domain, and optionally, how many other documents are in the domain). In some implementations, the domain-to-document transition probability, such as the transition probability from domain A 106 to document A 104, is 0 if the document is not in the domain, and otherwise is 1 divided by the number of documents in the domain, e.g.:

$$P_{tran}(w_A, d_A) = \frac{domainOf(d_A, w_A)}{\sum_{d_i \in S_d} domainOf(d_i, w_A)},$$

where $P_{tran}(w_A, d_A)$ is the transition probability from domain A 122 to document A 104, domainOf(d, w) has a value of 1 if the document d is in the domain w and a value of 0 otherwise, and $S_d$ is the set of documents in the search history data. Other domain-to-document transition probabilities are also possible. For example, in some implementations, a threshold value is selected, for example, empirically, and the transition probability is selected to satisfy the threshold (e.g., exceed the threshold) if the document is in the domain, and otherwise is selected to not satisfy the threshold (e.g., be below the threshold).

The system can also calculate a query-to-advertisement transition probability that measures how important revenue from advertisement is to overall revenue generated for the query. In some implementations, the system can calculate the transition probability from query B 116 to advertisement A 110 by dividing the revenue generated when advertisement A 110 is displayed in response to query B 116 by the total revenue generated by advertisements presented in response to query B 116, e.g.:

$$P_{tran}(q_B, a_A) = \frac{rev(q_B, a_A)}{\sum_{a_i \in S_a} rev(q_B, a_i)},$$

where $P_{tran}(q_B, a_A)$ is the transition probability from query B 116 to advertisement A 110, rev(q, a) is the revenue generated when advertisement a is presented in response to query q, and $S_a$ is the set of ads for which there is revenue data. Other ways of calculating the transition probability are also possible.

The system can also calculate an advertisement-to-query transition probability that measures how important revenue from a query is to overall revenue generated for an advertisement. For example, the system can calculate the transition probability from advertisement A 110 to query B 116 by dividing the revenue generated when advertisement A is presented in response to query B by the total revenue generated from advertisement A, e.g.:

$$P_{tran}(a_A, q_B) = \frac{rev(q_B, a_A)}{\sum_{q_i \in S_q} rev(q_i, a_A)},$$

where $P_{tran}(a_A, q_B)$ is the transition probability from advertisement A 110 to query B 116, rev(q, a) is the revenue generated when advertisement a is presented in response to query q, and $S_a$ is the set of ads for which there is revenue data. Other ways of calculating the transition probability are also possible.

Figure 4:
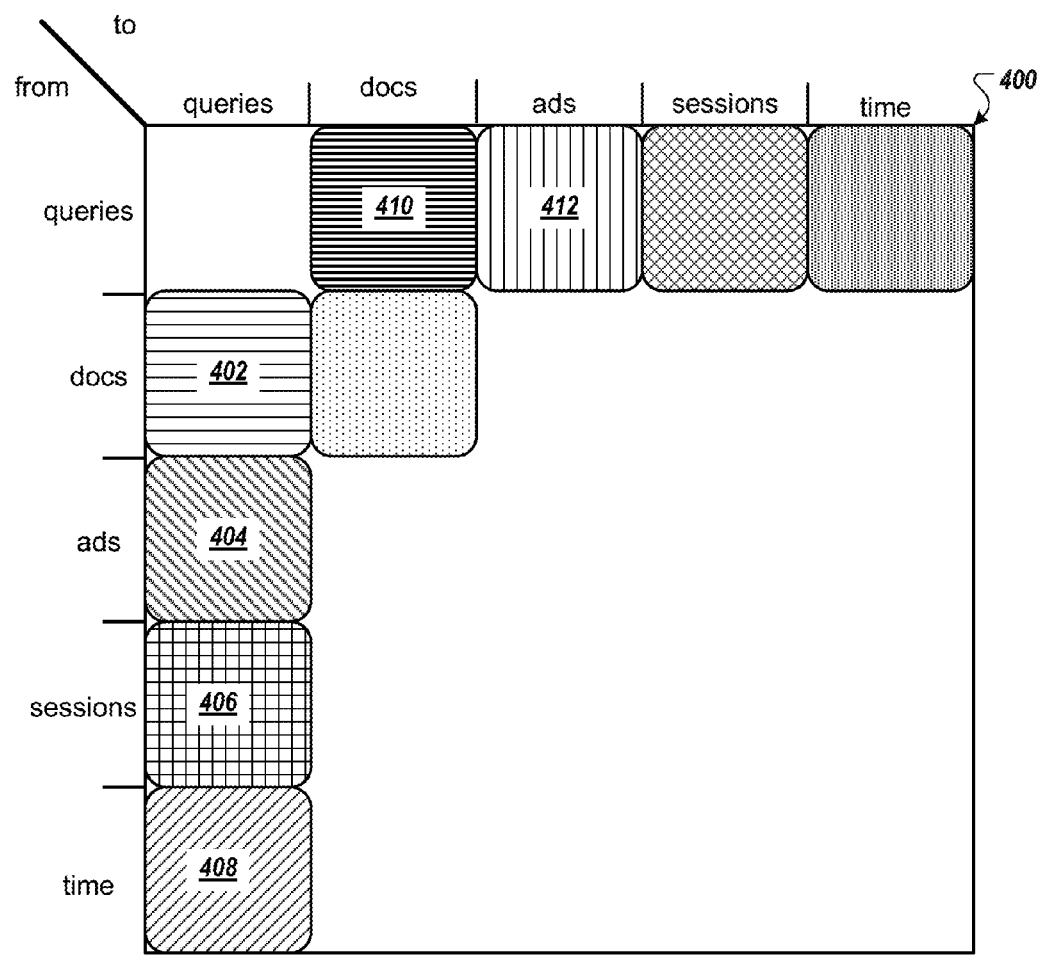
FIG. 4 illustrates an example transition matrix generated from transition probabilities between entities.

FIG. 4 illustrates an example transition matrix 400 generated from the first order transition probabilities between entities shown in FIG. 1. The transition matrix shown in FIG. 4 stores first order transition probabilities for a finite Markov chain, including transition probabilities between pairs of the queries, documents, ads, sessions, and time. For example, the document-to-query transition probabilities are stored in block 402, the advertisement-to-query transition probabilities are stored in block 404, the session-to-query transition probabilities are stored in block 406, and the time-to-query transition probabilities are stored in block 408. Similarly, the query-to-document transition probabilities are stored in block 410, the query-to-advertisement transition probabilities are stored in block 412, and so on. The transition probabilities stored in matrix 400 are first order, because they are derived only from the search history data, and do not include indirect transition probabilities.

Higher order transition probabilities (i.e., transition probabilities including indirect transition probabilities) between entities are calculated through a series of multiplications of the transition matrix. Each multiplication is equivalent to one step in the Markov chain and allows the system to incorporate indirect transition probabilities for that additional step. For example, second order query-to-query transition probabilities are calculated by multiplying the matrix 400 (or at least the part 410 of the matrix including the query-to-document transition probabilities) by the matrix 400 (or at least the part 402 of the matrix including the document-to-query transition probabilities). The resulting product for each query pair is the transition probability of moving from a node corresponding to the first query in the pair to a node corresponding to the second query in the pair, going through documents connected to the two query nodes in the graph. Higher order transition probabilities (especially those resulting from more than two multiplications of the transition matrix) can expose indirect relationships between entities that otherwise seem unrelated.

The types of transition probabilities that are multiplied during the matrix multiplication reflect how the entities are related. For example, query-to-query transition probabilities can be calculated by multiplying query-to-document transition probabilities by document-to-query transition probabilities, or query-to-query transition probabilities can be calculated by multiplying query-to-time transition probabilities by time-to-query transition probabilities. The first type of query-to-query transition probability relates queries based on the documents that users select in response to the queries, while the second type of query-to-query transition probability relates queries based on the times they have increases in popularity.

In addition to identifying real relationships between entities, the Markov chain model can identify weak relationships between entities that are due to noise in the model. These weak relationships will be further reinforced by multiple matrix multiplications. In some implementations, the system addresses the problems posed by these weak relationships through one or more of clipping, row normalization, and raising the entries in the matrix to an exponential power. The system performs clipping by discarding transition probabilities in the matrix that are below a certain threshold (determined, for example, empirically). The system performs row normalization by dividing the entities in each row of the matrix by the sum of the entries in the row (e.g., so that the entities in each row will sum to one). The system raises the entities in the matrix to an exponential power to either lessen the effect of weak relationships or increase the effect of weak relationships. In general, the fact that there is an entry in the matrix for two entities tells you that there is a relationship between the entities, and that the relationship has a certain strength. Exponents above 1 accentuate the strength of the relationship over the fact that there is a relationship, and will generally lessen the effect of weak relationships (when probabilities are all less than or equal to one) and lead to the development of clusters of entities. Exponents below 1 (e.g., between 0 and 1) accentuate the fact that there is a relationship over the strength of the relationship and will increase the effect of weak relationships (when probabilities are all less than or equal to one) and lead to fewer clusters. An exponent of 0 has the same effect as the egalitarian step function described above. In some implementations, the system performs one or more of clipping, row normalization, and raising the entries in the matrix to an exponential power after each multiplication of the matrices. In alternative implementations, the system performs the clipping, row normalization, and raising the entries in the matrix to an exponential power less frequently, e.g., only once the matrix multiplications are complete.

Other forms of the transition matrix 400 can also be used, for example, different entities can be included in the transition matrix, including domains, users, and anchors in documents. As another example, smaller forms of the transition matrix can be used, for example, a transition matrix that just includes document-to-query and query-to-document transition probabilities (e.g., blocks 402 and 410). As yet another example, an aggregate transition matrix, resulting from the multiplication of two or more transition matrices can also be used.

The first order and higher order transition probabilities described above can be used in a variety of applications. For example, advertisement-to-query and query-to-advertisement transition probabilities can be used to identify advertisements relevant to a user's query (e.g., by identifying the advertisement with the highest transition probability from the query). Advertisement-to-query and query-to-advertisement transition probabilities can also be used to determine how commercial a query is (i.e., queries with a high transition probability to many advertisements are more commercial than queries with lower transition probabilities to the advertisements). Queries that are identified as commercial queries can be determined to be more likely to be spam queries, or responsive search results to commercial queries can be ranked differently than results responsive to non-commercial queries. Some additional exemplary uses of the transition probabilities are described below.

Figure 5:
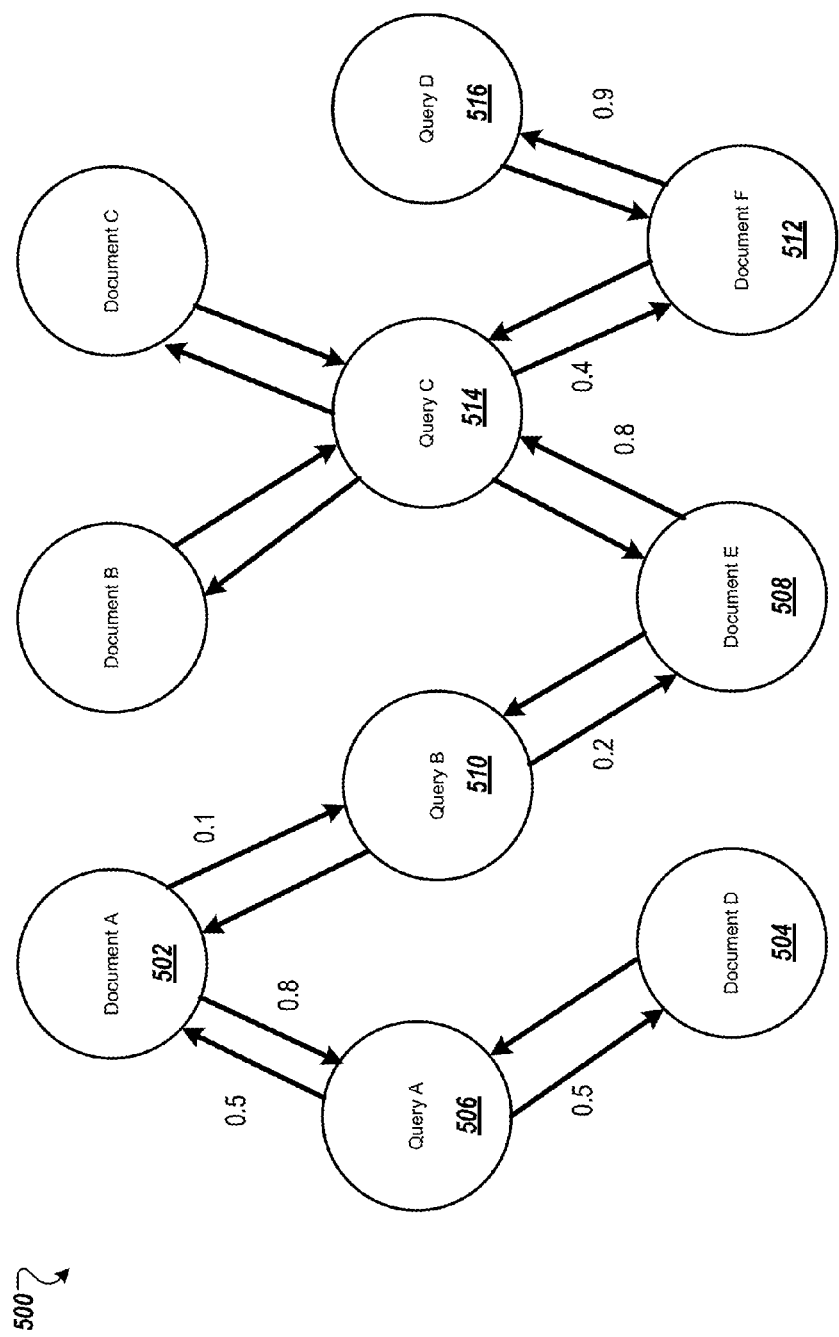
FIG. 5 is a graph illustrating transition probabilities between queries and documents.

FIG. 5 is a graph illustrating transition probabilities between queries and documents. The graph is a graphical representation of a transition matrix, such as the transition matrix described above with reference to FIG. 4. The transition probabilities illustrated in the graph can be used by a system, for example, by the search system 214 or another system, to identify relationships between documents and queries, for example, between pairs of queries, pairs of queries and documents, and pairs of documents. While the examples below focus on multiplying individual transition probabilities identified from the graph, the same effect can be achieved for all nodes in the graph by multiplying transition matrices storing data corresponding to the relevant transitions.

The system uses the transition probabilities illustrated in the graph to generate transition probabilities between pairs of queries by multiplying query-to-document transition probabilities by document-to-query transition probabilities along a path between the two queries. For example, query C 514 and query D 516 are connected through document F 512 (e.g., because the system stores data for the transition from query C 514 to document F and the transition from document F to query D 516 in a transition matrix). Therefore, a transition probability between query C 514 and query D 516 can be calculated by multiplying the transition probability from query C 514 to document F 512 by the transition probability from document F 512 to query D 516 (i.e., 0.4 times 0.9, or 0.36). The system can also calculate transition probabilities for queries that are not directly joined through a single document in the graph by performing additional multiplications. For example, query A 506 and query C 514 are connected on a path through document A 502 to query B 410 to document E 508. Therefore, a transition probability from query A 506 to query C 514 can be calculated by multiplying the transition probability from query A 506 to document A 502 (0.5) by the transition probability from document A 502 to query C 514. The transition probability from document A 502 to query C 514 can be calculated by multiplying the transition probability from document A 502 to query B 510 (0.1) by the transition probability from query B 510 to document E 508 (0.2) by the transition probability from document E 508 to query C 514 (0.8).

While the above examples describe calculating transition probabilities when there is a single path between two queries in the graph, transition probabilities can similarly be calculated when there are multiple paths between queries, for example, by taking the sum of the transition probabilities along the paths.

The system can use the query-to-query transition probabilities to identify two queries as related queries, for example, when the transition probability between the queries exceeds a given threshold. The threshold can be an absolute number or can be determined based on the transition probabilities for the queries being compared. For example, the system could empirically determine that every query-to-query transition probability above a certain value indicates that the queries corresponding to the transition probability are related. Alternatively, the system could calculate the threshold based on the query-to-query transition probabilities that were generated. For example, the system could set the threshold to be a percentage of the highest transition probability or a multiple of the lowest transition probability. Other techniques for determining the threshold are also possible. For example, the system can calculate the transition probability from a query to itself and set the threshold for all query-to-query transitions from that query to be the transition probability from the query to itself or the product of the transition probability from the query to itself scaled by a factor. The factor can be determined, for example, empirically.

The system can also use the transition probabilities illustrated in the graph to identify relationships between queries and documents. For example, the system can calculate the transition probability from query A 506 to document A 502 by identifying the transition probability from query A 506 to document A 502 (0.5). The system can also calculate transition probabilities between documents and queries when there is not a direct transition between the document and the query in the graph. For example, the system can calculate the transition probability from query A 506 to document E 508 by multiplying the transition probability from query A 506 to document A 502 by the transition probability from document A 502 to query B 510 by the transition probability from query B 510 to document E 508 (i.e., 0.5 times 0.1 times 0.2, or 0.01).

In some implementations, the system uses the transition probability from a query to a document (or another value calculated from the transition probability) to modify data provided as input to a document ranking process used to rank documents responsive to the query. For example, in some implementations, for a given document and a given query, the system identifies a document that has a high rank as a search result for the query and that is related to the given document by the transition probabilities. The system then provides signals for the highly ranked document and the given query to the ranking process as signals for the given document and the given query. The signals can include, for example, an overall score for the document and the query or an overall measure of the quality of the document. In some further implementations, the system scales the signals, for example, by the transition probability or a factor derived from the transition probability before they are provided to the document ranking process.

The system can also generate transition probabilities from one document to another from transition probabilities between the documents and queries. For example, the search system can calculate a query-based document-to-document transition probability from document A 502 to document D 504 from the document-to-query transition probability from document A 502 to query A 506 and the query-to-document transition probability from query A 506 to document D 504, for example, by multiplying the document-to-query transition probability by the query-to-document transition probability (i.e., 0.8 times 0.5, or 0.40). Similarly, the search system can calculate a document-to-document transition probability from document A 502 to document E 508 by multiplying the document-to-query transition probability from document A 502 to query B 510 by the query-to-document transition probability from query B 510 to document E 508 (i.e., 0.1 times 0.2, or 0.02). In some implementations, the search system can perform additional multiplications to reach documents that are an additional step away in the graph. For example, the document-to-document transition probability from document A 502 to document F 512 can be calculated by multiplying the document-to-query transition probability from document A 502 to query B 510 (0.1) by the query-to-document transition probability from query B 510 to document F 512. The document-to-query transition probability from query B 510 to document F 512 can be calculated by multiplying the query-to-document transition probability from query B 510 to document E 508 by the document-to-query transition probability from document E 512 to query C 514 by the query-to-document transition probability from query C 514 to document F 512 (0.2 times 0.8 times 0.4, or 0.064).

The system can use these query-based document-to-document transition probabilities to identify documents as related. For example, if the transition probability from one document to another exceeds a certain threshold, the two documents can be related. Once the documents are related, the system can use the relationships in various ways, for example, to identify additional documents responsive to a search query and modify the rankings of documents responsive to the query, or to modify the score of a document based on anchors, text, and queries associated with related documents.

Figure 6:
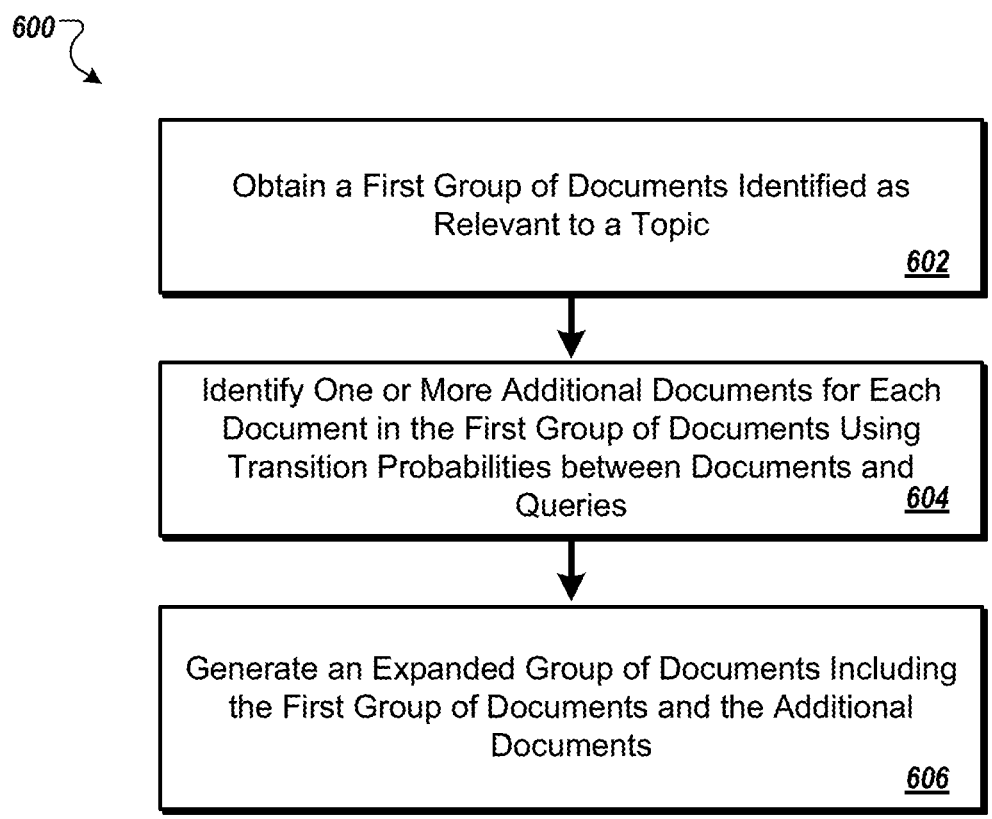
FIG. 6 illustrates an example method for identifying an expanded group of documents relevant to a topic from an initial group of documents relevant to the topic.

FIG. 6 illustrates an example method 600 for identifying an expanded group of documents relevant to a topic from an initial group of documents relevant to the topic. For convenience, the method 600 will be described with reference to a system that performs the steps of the method. The system can be, for example, a search system or another system.

The system obtains a first group of documents identified as relevant to a topic (step 602). In general, a topic is a category or an area of interest. In some implementations, the group of documents is pre-defined, and the system obtains the documents, for example, by retrieving them from a database that associates topics with groups of documents.

In some implementations, the system identifies some or all of the first group of documents from a set of queries identified as relevant to the topic. For example, the system can receive a set of queries identified as relevant to the topic and select a group of documents with a high query-to-document transition probability from one or more of the queries. The documents can be selected based on a high query-to-document transition probability from an individual query in the set of queries, or based on a high query-to-document transition probability from multiple queries in the set of queries (for example, all of the queries, or a subset of two or more queries). When the documents are selected based on query-to-document transition probabilities from more than one query, the documents can be selected, for example, based on a sum of their query-to-document transition probabilities for the relevant queries. In some implementations, the system combines an initial group of documents identified as relevant to the topic with the group of documents identified from the queries to obtain the first group of documents.

The system identifies one or more additional documents for each document in the first group of documents using transition probabilities from documents to queries and from queries to documents (step 604). The system identifies the one or more additional documents, for example, as described above with reference to FIG. 5, by generating document-to-document transition probabilities by multiplying document-to-query and query-to-document transition probabilities, either individually, or through multiplication of transition matrices, and then selecting additional documents whose transition probabilities satisfy a given threshold.

The system then generates an expanded group of documents including the additional documents (step 606). For example, the system can combine the first group of documents and the additional documents identified in step 604 into one set of documents. Alternatively, the system can generate the expanded group of documents from just the additional documents Once the system generates an expanded group of documents, the system can present the documents to a user, for example, by transmitting data for the documents, or a summary or description of the documents, to a client computer of the user.

Figure 7:
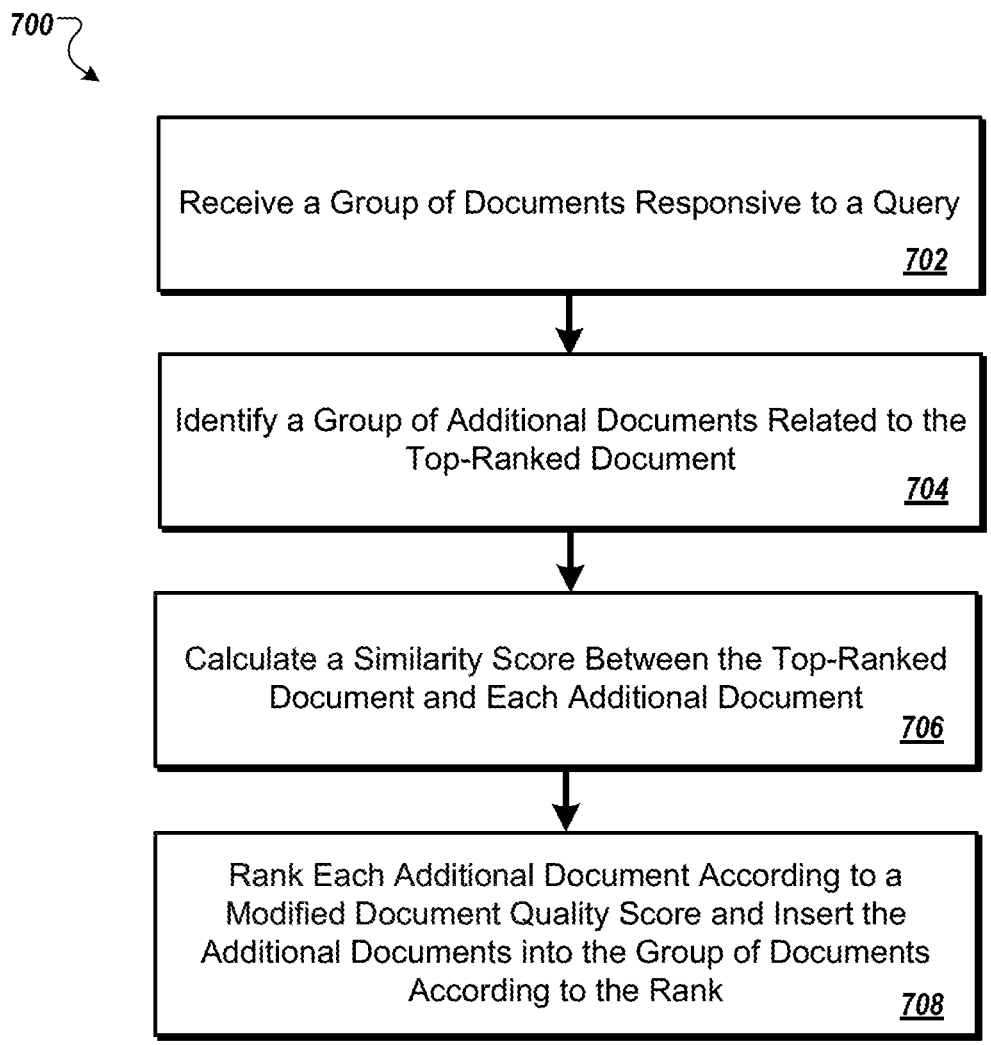
FIG. 7 illustrates an example method for augmenting a group of documents responsive to a query with documents related to the top ranked document in the group of documents.

FIG. 7 illustrates an example method 700 for augmenting a group of documents responsive to a query with documents related to the top ranked document in the group of documents. For convenience, the method 700 will be described with reference to a system that performs the steps of the method. The system can be, for example, the search system 214 or another search system.

The system receives a group of documents responsive to a query (step 702). The documents can be received, for example, from a search engine such as the search engine 230. The documents are ranked based in part on a document quality score, and include a top-ranked document. Generally speaking, the document quality score is a metric for the document that a search system can use to determine an appropriate rank for the document. The document quality score can reflect an overall quality of the document (e.g., how often other documents link to the document, or the general popularity of the document), or the document quality score can reflect a correspondence between the query and the document (e.g., how often query terms appear in the document, how often users click on the document after submitting the query, etc.).

The system identifies a group of additional documents related to the top-ranked document (step 704), for example, using the method 600 described above with reference to FIG. 6.

The system then calculates a similarity score between the top-ranked document and each additional document (step 706). The similarity score can be calculated from the transition probabilities from the top-ranked document to one or more queries, and from the one or more queries to each of the additional documents. For example, the similarity scores can be the transition probabilities from the top-ranked document to each additional document, calculated as described above with reference to FIG. 5, or can be derived from the transition probabilities (for example, by multiplying the transition probabilities by a constant). In some implementations, the similarity score is calculated during step 704, and merely retrieved in step 706.

The system then calculates a modified document quality score for each of the additional documents and inserts the additional documents into the group of documents responsive to the query according to the modified document quality score (step 708). The system calculates the modified document quality score from the document quality score of the top-ranked document and the similarity score between the additional document and the top-ranked document, for example, by multiplying the similarity score by the document quality score of the top-ranked document.

In some implementations, the system inserts the additional documents into the group of documents by calculating a ranking score for each of the additional documents using the modified document quality score and adding the additional document to the group of documents in a location based on the ranking score. For example, if the group of documents is sorted from lowest score to highest score, the additional document is inserted into the group of documents at the appropriate location given its ranking score. In some implementations, the group of documents is not stored in a sorted order and inserting the additional document into the group of documents according to the modified document quality score means adding the additional document to the group of documents and storing the ranking score for the additional document in the same way the scores for the other documents in the group are stored. In some implementations, at least one of the additional documents is already included in the group of documents, and inserting the additional document into the group of documents means that the score for the additional document is modified to reflect the modified document quality score.

In some implementations, the system identifies additional documents related to a set of the top-ranked documents, rather than a single top-ranked document. In these implementations, the system can rank each of the additional documents based on the similarity score between the additional document and one or more of the top-ranked documents and the document quality score of the top-ranked document. For example, the system can use a weighted average of the document quality scores of the top-ranked documents, where the document quality scores are weighted by the similarity score of the corresponding top-ranked document and the additional document.

Figure 8:
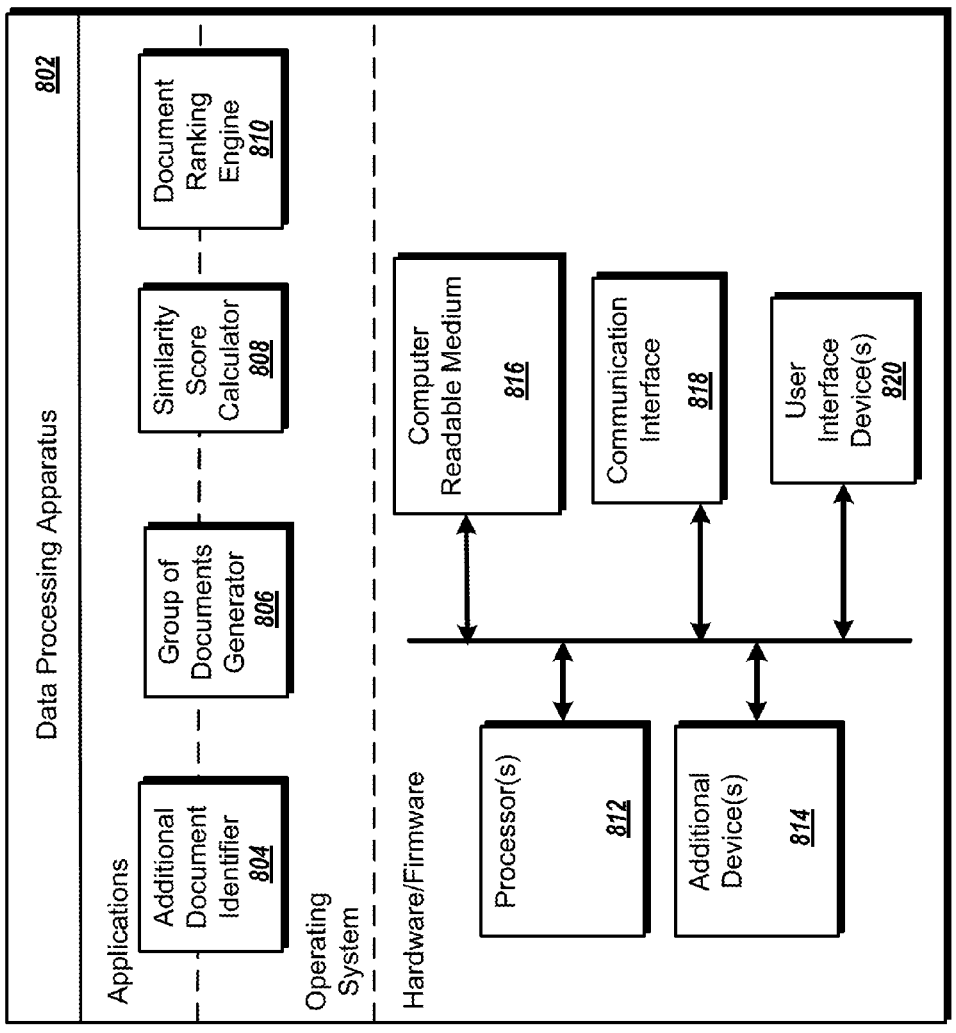
FIG. 8 illustrates an example architecture of a system that performs the methods illustrated in FIGS. 6 and 7.

FIG. 8 illustrates an example architecture of a system 800. The system generally consists of a data processing apparatus 802. While only one data processing apparatus is shown in FIG. 8, multiple data processing apparatus can be used.

The data processing apparatus 802 includes various modules, e.g. executable software programs, including an additional document identifier 804, a group of documents generator 806, a similarity score calculator 808, and a document ranking engine 810. Each module runs, for example, as part of an operating system on the data processing apparatus, runs as one or more applications on the data processing apparatus, or runs as part of the operating system and part of one or more applications. The additional document identifier 804 can identify one or more additional documents related to a group of documents, for example, as described above with reference to FIG. 6. The group of documents generator 806 can combine an initial group of documents with one or more additional documents, resulting in a final set of documents, for example, as described above with reference to FIG. 6. The group of documents generator 806 can optionally generate the final set of documents in a ranked order, for example, as described above with reference to FIG. 7. The similarity score calculator 806 calculates a similarity score between two documents based on transition probabilities from the first of the documents to one or more queries, and the one or more queries to the second of the documents, for example, as described above with reference to FIG. 7. The document ranking engine 810 generates rankings for documents responsive to a query based on one or more signals, for example, as described above with reference to FIG. 7. The modules can be combined or sub-divided differently than shown in FIG. 8.

The data processing apparatus 802 can also have hardware or firmware devices including one or more processors 812, one or more additional devices 814, computer readable medium 816, a communication interface 818, and one or more user interface devices 820. Each processor 812 is capable of processing instructions for execution within the data processing apparatus 802. In some implementations, the processor 812 is a single-threaded processor. In other implementations, the processor 812 is a multi-threaded processor. The processor 812 is capable of processing instructions stored on the computer readable medium 816 or on the one or more additional devices 814. The data processing apparatus 802 can use its communication interface 818 to communicate with one or more computers, for example, over a network. For example, the data processing apparatus 802 can receive queries from a user computer through its communication interface. Examples of user interface devices 820 include a display, a camera, a speaker, a microphone, a tactile feedback device, a keyboard, and a mouse.

The data processing apparatus 802 can store instructions that implement operations associated with the modules described above, for example, on a computer readable medium 816 or one or more additional devices 814, for example, one or more of a floppy disk device, a hard disk device, an optical disk device, or a tape device. In some implementations, the data processing apparatus 802 also stores one or more of transition matrices, search history data, or other data on the computer readable medium 816 or on one or more additional devices 814.

Figure 9:
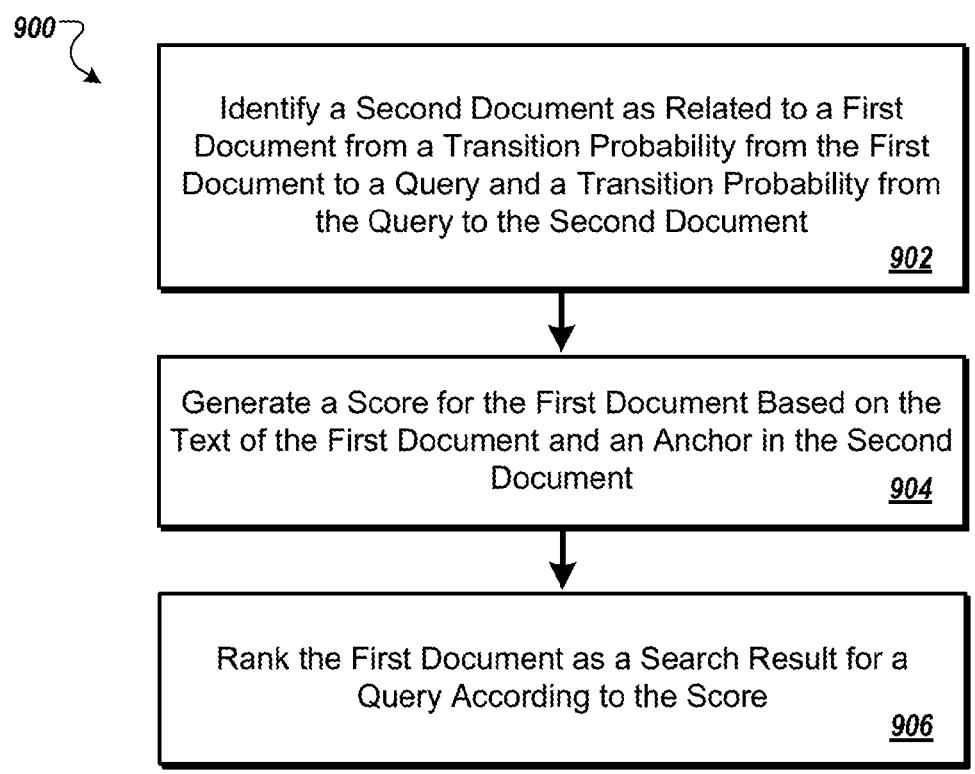
FIG. 9 illustrates an example method for scoring a first document relevant to a query based on anchors from a second document that is related to the first document.

FIG. 9 illustrates an example method 900 for scoring and ranking a first document relevant to a query based on anchors from a second document that is related to the first document. For convenience, the method 900 will be described with reference to a system that performs the steps of the method. The system can be, for example, the search system 214 or another search system.

The system identifies a second document as related to a first document from a transition probability from the first document to a query and from the query to the second document (step 902), for example, as described above with reference to FIG. 5. In some implementations the system further identifies the two documents as related based on a transition probability from the first document to the second document based on the anchors in the first document. The document-to-document transition probability can be calculated, for example, as described above with reference to FIG. 1. Alternatively, the document-to-document transition probability can be calculated by multiplying a transition probability from the first document to an anchor and a transition probability from the anchor to the second document. In some implementations, the transition probability from a document to an anchor measures the strength of the relationship between the document and the anchor based on whether the document includes the anchor. For example, the transition probability can be 1 if the document includes the anchor, and 0 otherwise. In some implementations, the transition probability from an anchor to a document measures the strength of the relationship between the anchor and the document based on whether the anchor links to the document. For example, the transition probability can be 1 if the anchor links to the document, and 0 otherwise. If the query-based transition probability between the two documents satisfies a threshold and the anchor-based transition probability between the two documents satisfies a threshold, then the system determines that the two documents are related.

The system generates a score for the first document based on the text of the first document and an anchor in the second document (step 904). The system can generate the score, for example, by treating the first document as if it included the anchor in the second document, and then scoring the first document the way it normally would, if the first document included the anchor in the second document. In some implementations, the effect of the anchor on the score is weighted based on a similarity score for the first and second documents. The similarity score can be derived from the transition probability from the first document to the second document, calculated, for example, as described above with reference to FIG. 5. The similarity score can be the transition probability itself, or another value derived from the transition probability. In some implementations, the similarity score further reflects the anchor based document-to-document transition probability between the two documents.

In some implementations, the score for the first document is further based on text from the second document. For example, the system can score the first document as if it contained text from the second document (e.g., as if it contained all of the text of the second document, or a subset of the text, such as the title of the document). In general, the system scores the first document as if it contained text from the second document by scoring the augmented second document in the same way it would score a document having the text of the first document and the additional text from the second document.

In some implementations, the score for the first document is further based on a query associated with the second document. For example, if the system scores a query and a document based in part on a quality of result statistic for a query and a document, the system can use the quality of result statistic for the query and the second document (or a weighted version of the quality of result statistic for the query and the second document) as the quality of result statistic for the query and the first document. The system can weight the quality of result statistic based on the similarity score between the two documents.

The system ranks the first document as a search result for the query according to the score (step 906). The system can rank the document according to the score for example, using a ranking engine that receives documents responsive to a query and scores for the documents, and orders the documents according to the score (for example, from lowest to highest or highest to lowest score).

Figure 10:
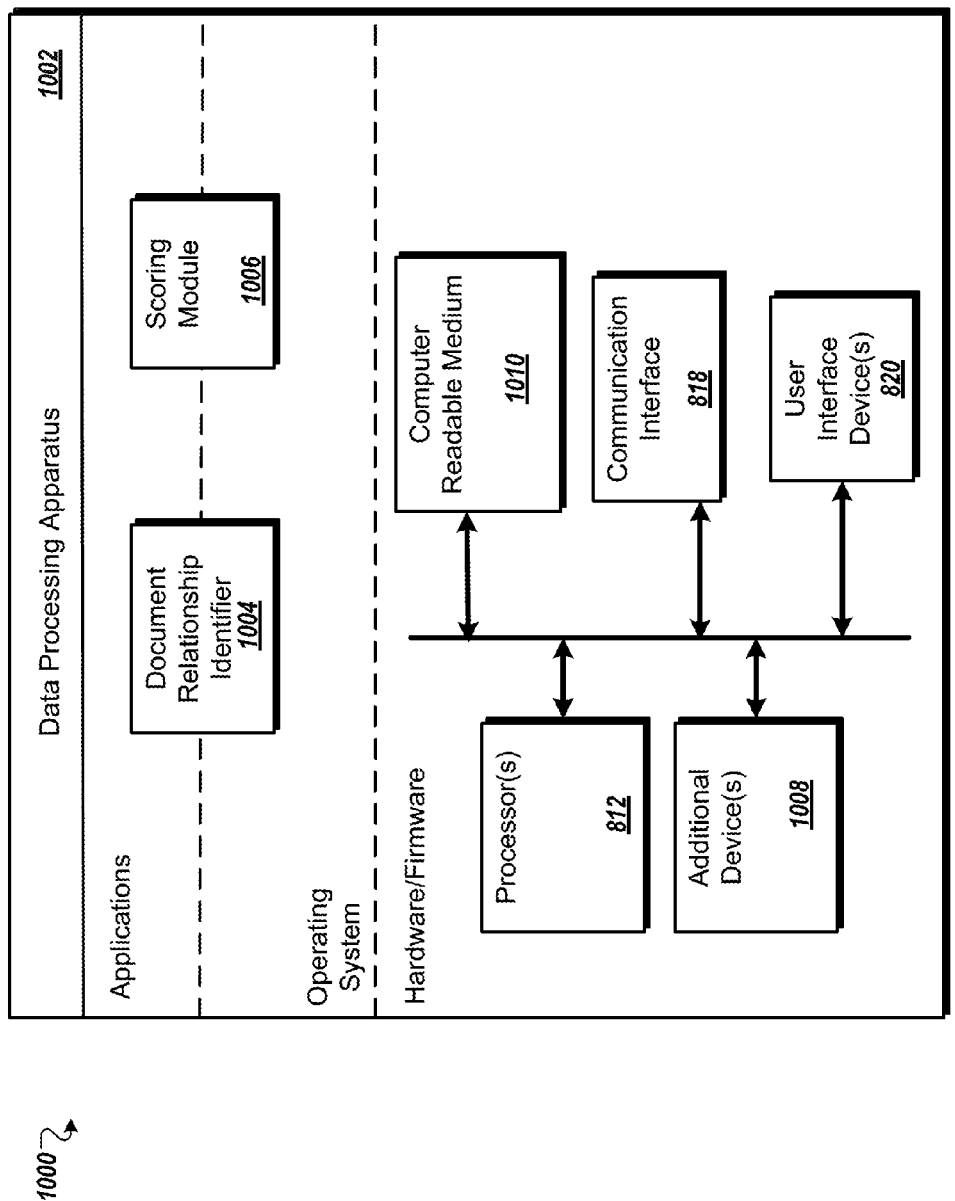
FIG. 10 illustrates an example architecture of a system that performs the method illustrated in FIG. 9.

FIG. 10 illustrates an example architecture of a system 1000. The system generally consists of a data processing apparatus 1000. While only one data processing apparatus is shown in FIG. 10, multiple data processing apparatus can be used.

The data processing apparatus 1002 includes various modules, e.g. executable software programs, including a document relationship identifier 1004 and a scoring module 1006. Each module runs, for example, as part of a operating system on the data processing apparatus, runs as one or more applications on the data processing apparatus, or runs as part of the operating system and part of one or more applications. The document relationship identifier 1004 identifies a second document related to a first document, for example, as described above with reference to FIG. 9. The scoring module 1006 modifies a score for the first document and a query based in part on one or more of anchors in the second document, text in the second document, or quality of result statistics for the second document and the query, for example, as described above with reference to FIG. 9. The modules can be combined or sub-divided differently than shown in FIG. 10.

The data processing apparatus 1002 can also have hardware or firmware devices including one or more processors 812, a communication interface 818, and one or more user interface devices 820. These devices are described above with reference to FIG. 8.

The data processing apparatus 1002 can store instructions that implement operations associated with the modules described above, for example, on a computer readable medium 1010 or one or more additional devices 1008. In some implementations, the data processing apparatus 802 also stores one or more of transition matrices, search history data, or other data on the computer readable medium 1010 or on one or more additional devices 1008.

Figure 11:
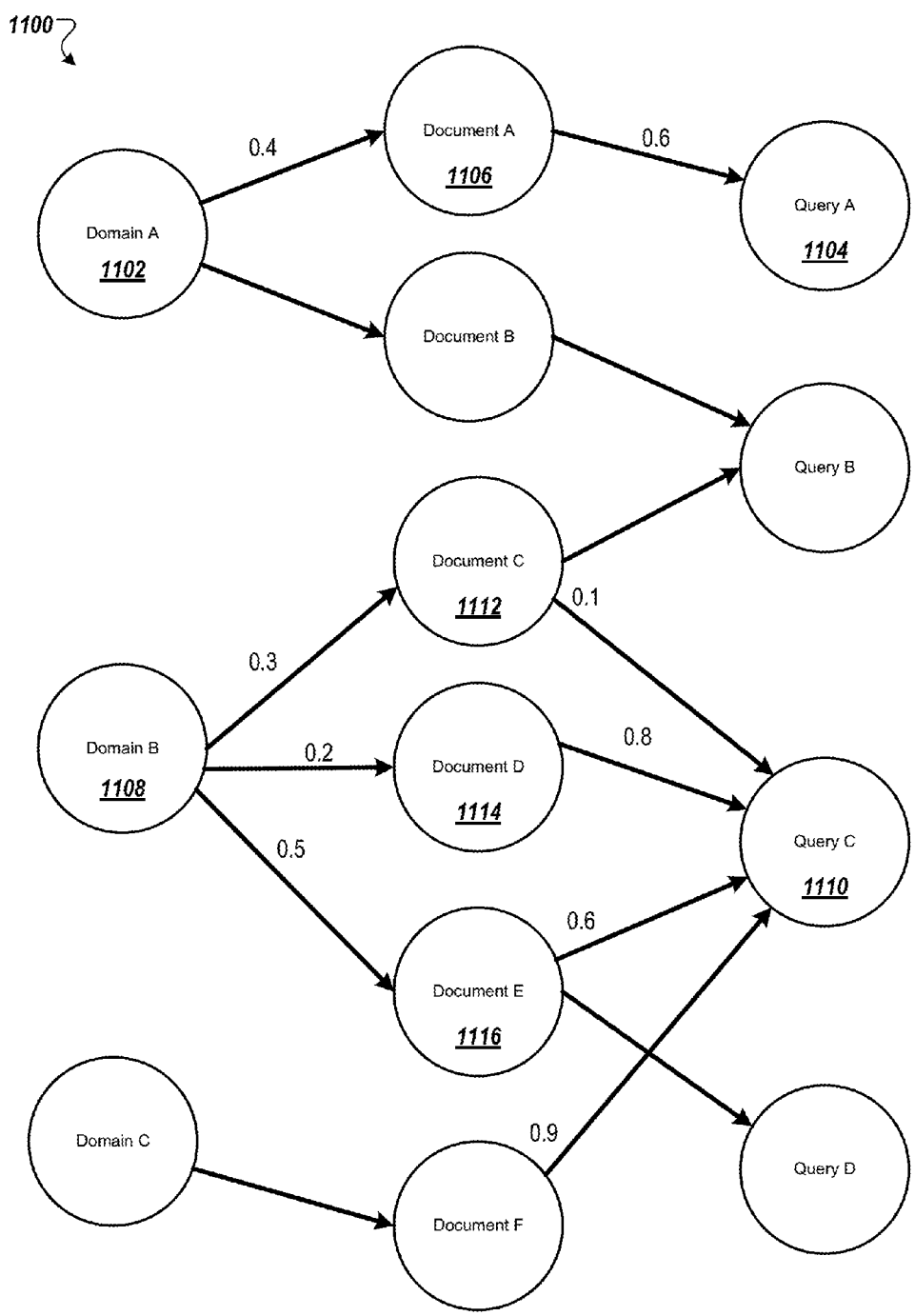
FIG. 11 is a graph illustrating transition probabilities between domains and documents and transition probabilities between documents and queries.

FIG. 11 is a graph illustrating transition probabilities between domains and documents and transition probabilities between documents and queries. The graph is a graphical representation of a transition matrix, such as the transition matrices described above with reference to FIG. 4. The transitions illustrated in FIG. 11 can be used by a system, for example, the search system 214, or another system, to identify queries related to documents in a given domain. While the examples below focus on multiplying individual transition probabilities illustrated in the graph, the same effect can be achieved for all nodes in the graph by multiplying transition matrices storing data corresponding to the relevant transitions.

The system can calculate domain-to-query transition probabilities from the transition probabilities shown in the graph by multiplying document-to-domain transition probabilities by document-to-query transition probabilities. For example, the system can calculate the transition probability from domain A 1102 to query A 1104 by multiplying the transition probability from domain A 1102 to document A 1106 by the transition probability from document A 1106 to query A 1104 (i.e., 0.4 times 0.6, or 0.24).

If multiple documents in the domain have a transition probability to the same query, the system can calculate the transition probability from the domain to the query by summing the transition probabilities from the domain to the query along the paths through each document in the domain. For example, the system can calculate the transition probability from domain B 1108 to query C 1110 by calculating the transition probability from domain B 1108 to query C 1110 through document C 1112 (0.3 times 0.1, or 0.03), calculating the transition probability from domain B 1108 to query C 1110 through document D 1114 (0.2 times 0.8, or 0.16), and calculating the transition probability from domain B 1108 to query C 1110 through document E 1116 (0.5 times 0.6, or 0.3), and then taking the sum of the three transition probabilities (0.3 plus 0.16 plus 0.3, or 0.76).

The system can also similarly calculate domain-to-domain transition probabilities, for example, by multiplying transition probabilities from a domain to a query by a transition probability from the query to the domain.

Once the system calculates transition probabilities from the domain to one or more queries, the system can identify one or more queries related to the domain from the transition probabilities, for example, by identifying the one or more queries with transition probabilities above a certain threshold. The threshold can be, for example, an absolute number, or determined based on the transition probabilities for the queries being compared. The system can also associate similar domains (based on a transition probability between the domains, or similar queries associated with the domains) and then propagate properties of one domain to the other domain.

Figure 12:
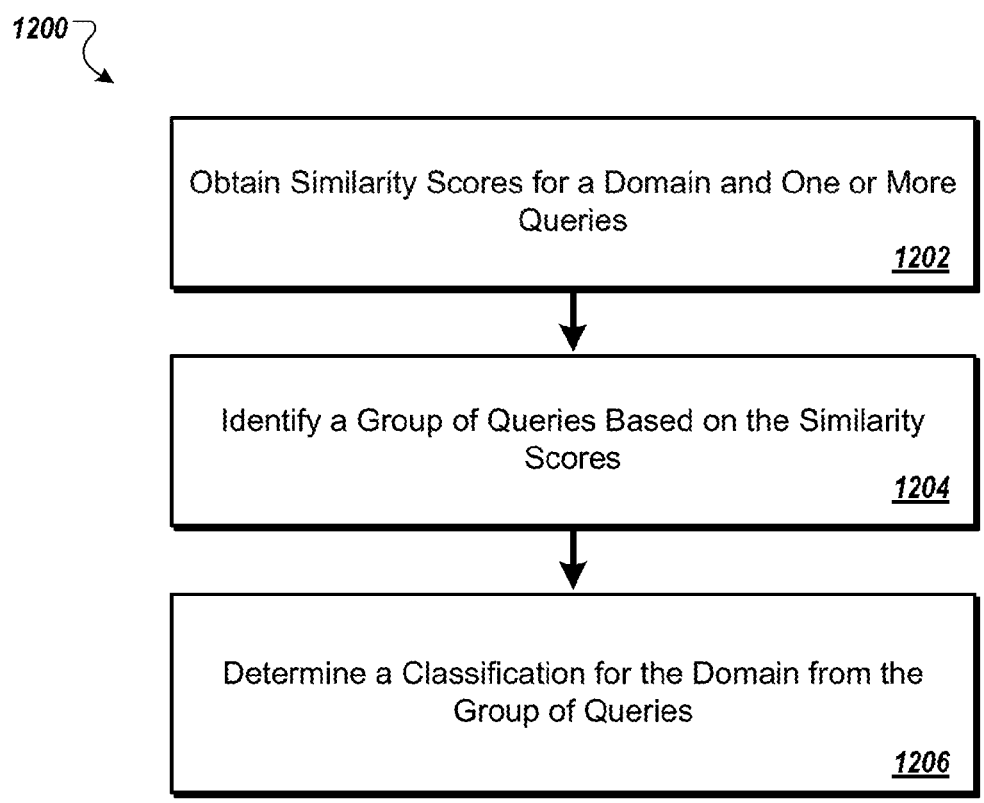
FIG. 12 illustrates an example method for classifying a domain based on queries related to the domain.

FIG. 12 illustrates an example method 1200 for classifying a domain based on queries related to the domain. For convenience, the method 1200 will be described with reference to a system that performs the steps of the method. The system can be, for example, the search system 214 or another system.

The system obtains similarity scores for a domain and one or more queries (step 1202). The similarity scores can be the transition probabilities between the domain and the queries, and can be calculated, for example, as described above with reference to FIG. 11. In some implementations, the similarity scores are pre-calculated and stored, for example, in a database. In alternative implementations, the system calculates the similarity scores as they are needed.

The system identifies a group of queries based on the similarity scores (step 1204). In some implementations, where higher similarity scores indicate a higher similarity, the group of queries is the group of queries whose similarity score exceeds a threshold, for example, as described above with reference to FIG. 11. In some implementations, where lower similarity scores indicate a higher similarity, the group of queries is the group of queries whose similarity scores are below a threshold.

The system then determines a classification for the domain from the group of queries (step 1206). The classification can be a single concept or can be multiple concepts. In some implementations, the classification is the queries themselves. For example, if a domain is associated with the queries "food" and "dessert," the domain can be classified as having a classification of "food" and "dessert." In alternative implementations, the classification can be derived from the text of the queries, for example, by looking the queries up in a database that associates queries with candidate classifications and selecting the classification (or multiple classifications) most commonly associated with the queries.

In some implementations, the system can determine a classification for a second domain, for example, using the method 1200, and then associate the two domains if they have the same classification. Associating two domains can include, for example, relating the two domains in the search system. In alternative implementations, the two domains are associated based on transition probabilities from domain to domain, calculated, for example, as described above with reference to FIG. 11.

The association between two domains can be used to propagate properties from one domain to another. For example, if one domain has been identified as a spam domain, the other domain can be similarly identified. If one domain is associated with a particular topic, the other domain can also be associated with the topic. If one domain has a given quality, the other domain can be assumed to have a similar quality. Other properties can also be propagated.

Figure 13:
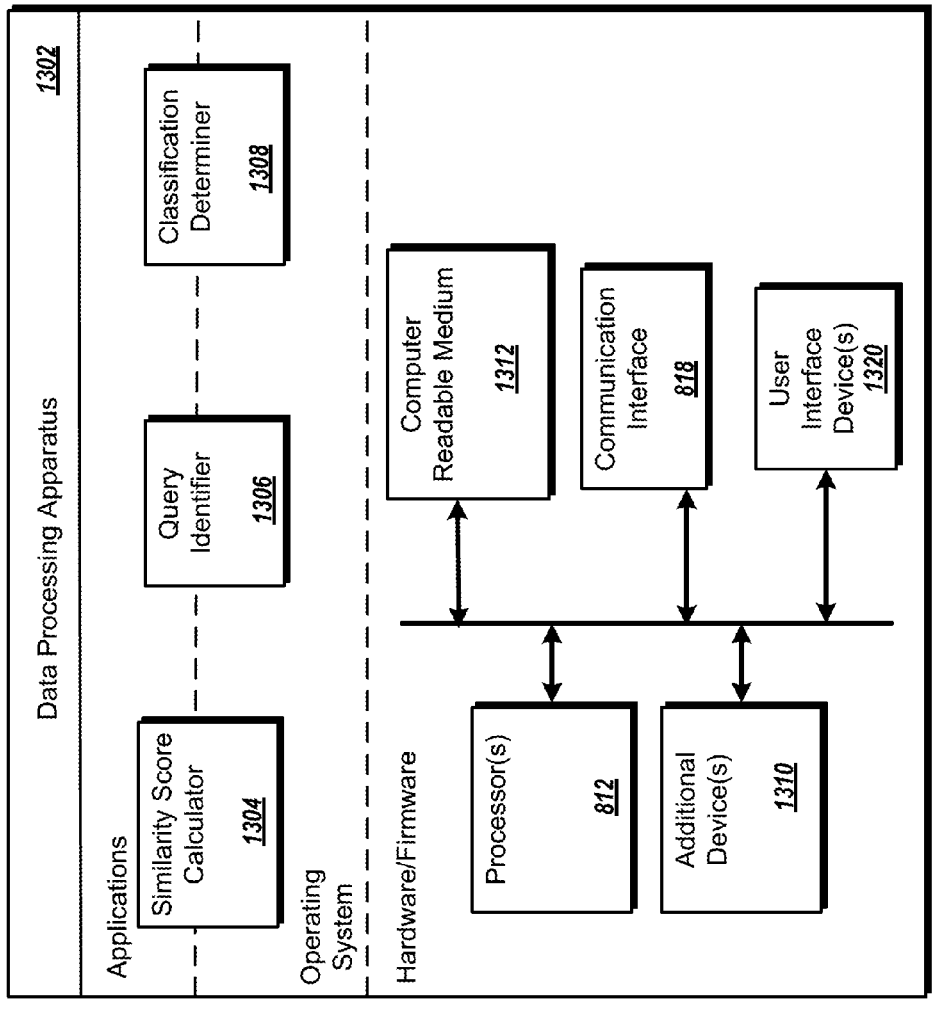
FIG. 13 illustrates an example architecture of a system that performs the method illustrated in FIG. 12.

FIG. 13 illustrates an example architecture of a system 1300. The system generally consists of a data processing apparatus 1302. While only one data processing apparatus is shown in FIG. 13, multiple data processing apparatus can be used.

The data processing apparatus 1302 includes various modules, e.g. executable software programs, including a similarity score calculator 1304, a query identifier 1306, and a classification determiner 1308. Each module runs, for example, as part of an operating system on the data processing apparatus, runs as one or more applications on the data processing apparatus, or runs as part of the operating system and part of one or more applications. The similarity score calculator calculates a similarity score between a domain and a query, for example, as described above with reference to FIG. 12. The query identifier 1306 identifies one or more queries related to a domain based on the similarity scores, for example, as described above with reference to FIG. 12. The classification determiner 1308 determines a classification for a domain based on the queries related to the domain, for example, as described above with reference to FIG. 12. The modules can be combined or sub-divided differently than shown in FIG. 13.

The data processing apparatus 1302 can also have hardware or firmware devices including one or more processors 812, a communication interface 818, and one or more user interface devices 820. These devices are described above with reference to FIG. 8.

The data processing apparatus 1302 can store instructions that implement operations associated with the modules described above, for example, on a computer readable medium 1312 or one or more additional devices 1310. In some implementations, the data processing apparatus 1312 also stores one or more of transition matrices, search history data, transition probabilities, or other data on the computer readable medium 1312 or on one or more additional devices 1310.

Figure 14:
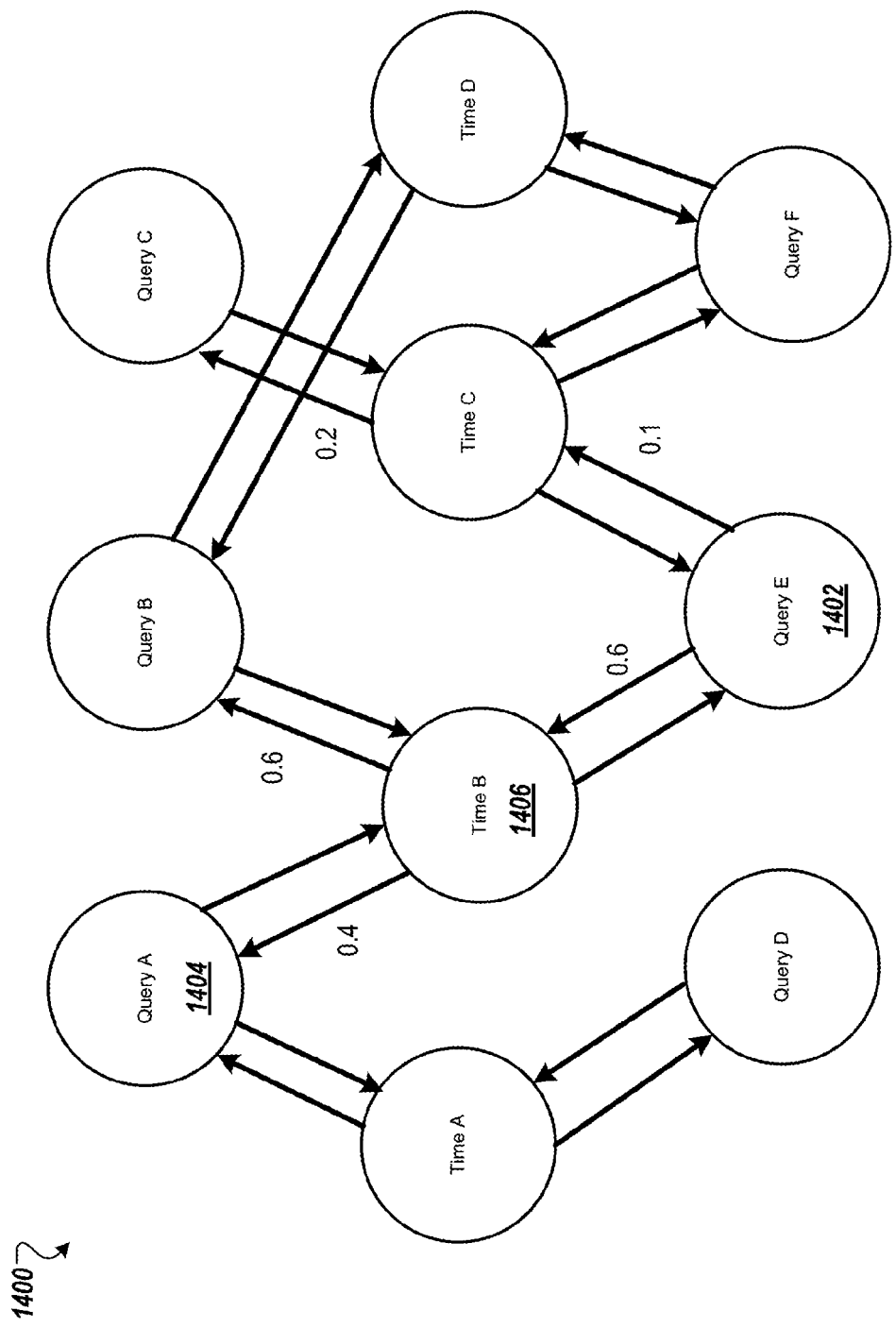
FIG. 14 is a graph illustrating example transition probabilities between queries and times when the queries had an increase in popularity.

FIG. 14 is a graph 1400 illustrating example transition probabilities between queries and times when the queries had an increase in popularity. The transitions illustrated in FIG. 14 can be used by a system, for example, the search system 214 or another search system, to identify queries that are temporally related. In general, queries are temporally related when they are issued around the same time. For example, queries for the movie awards event "the Oscars" and the holiday "Valentines Day" might both have an increase in popularity around the same time, since both are in February each year. Therefore, the system can determine that the two queries are temporally related. When queries are temporally related and one query has an increase in popularity (for example, when "Valentines Day" has an increase in popularity), the system can determine that the other query has (or soon will have) a similar increase in popularity. While the examples below focus on multiplying individual transition probabilities identified from the graph, the same effect can be achieved for all nodes in the graph by multiplying transition matrices storing data corresponding to the relevant transitions.

The transition probabilities illustrated in the graph 1400 can be used to calculate transition probabilities between two queries through a series of multiplications of transition probabilities. For example, the transition probability between query E 1402 and query A 1404 can be calculated by multiplying the transition probability between query E 1402 and time B 1406 by the transition probability between time B 1406 and query A 1404 (i.e., 0.6 times 0.4, or 0.24). Transition probabilities between entities that are connected along longer paths can also be calculated through additional multiplications.

The system can identify queries that are temporally related based on the calculated time-based query-to-query transition probabilities. For example, the system can determine that two queries are temporally related if their transition probability exceeds a threshold. The threshold can be, for example, an absolute number, or determined based on the transition probabilities for the queries being compared.

An increase in popularity of a query can be an indication that something new is occurring with the subject of the query, and therefore, content of documents responsive to the query may have changed or new documents relevant to the query may be added to the corpus of documents. For example, the Oscars awards show is different each year, and therefore new documents with stories about the Oscars will likely be added to the corpus of documents in the days leading up to and following the Oscars. If a new Oscars is about to be held (or has just been held), users searching for "Oscars" will likely want documents relevant to the current year's Oscars, not to previous years Oscars. However, traditional document scoring techniques rely on many signals, such as anchor scores and historical quality of result scores, that reflect a historical state of a corpus of documents, and do not reflect sudden changes to documents or user interests. Scoring data determined from anchors in a document and anchors to a document is based on a previously existing network of documents, and therefore can be considered a measure of the historical relevance of a document. Historical quality of results scores calculated from search history data over a past period of time reflect past relevance of a document to a query, and therefore can be considered a measure of the historical relevance of the document. Traditional document scoring techniques can also rely on other historical signals. Therefore, new documents, or newly updated documents, that are scored using these historical signals may not receive as high of a score as they should. To solve this problem, when the system detects that a query has (or soon will have) an increase in popularity, the system can favor fresh results for the query by, for example, discounting the weight the system gives to scoring signals based on historical data for documents or the documents and the query, or by increasing the weight given to scoring signals based on the content of the document itself (e.g., scoring signals estimating how often the query terms appear in the document).

Figure 15:
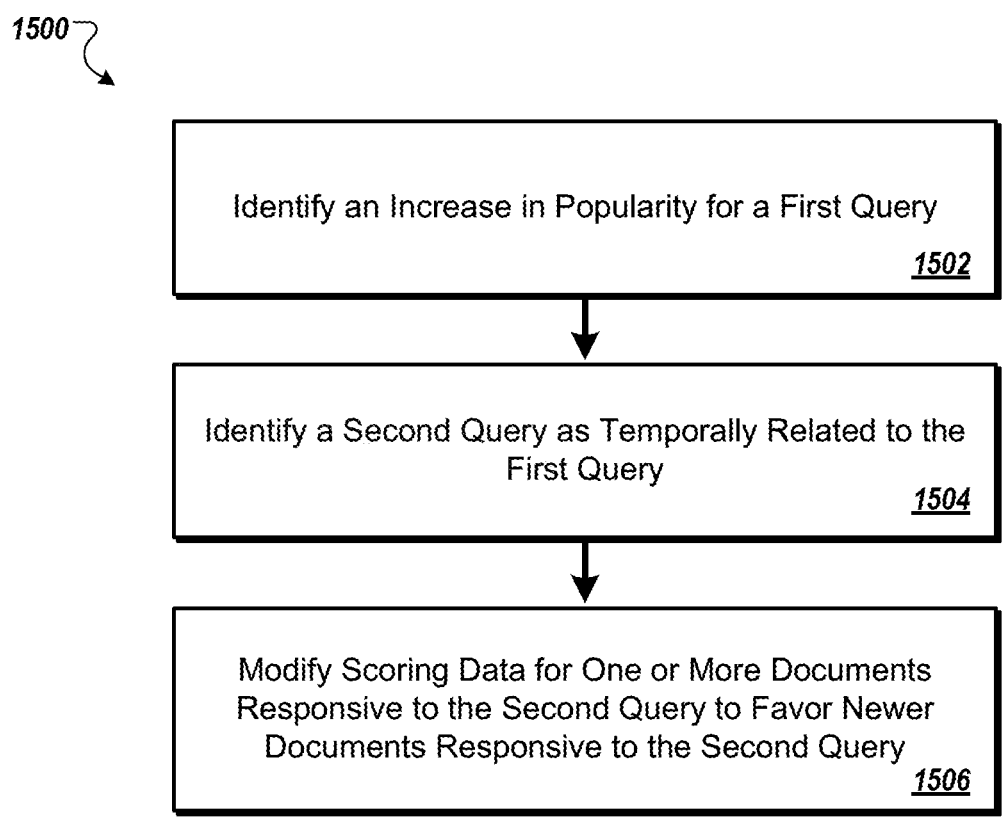
FIG. 15 illustrates an example method for temporal boosting of search results responsive to queries.

FIG. 15 illustrates an example method 1500 for temporal boosting of search results responsive to queries. For convenience, the method 1500 will be described with reference to a system that performs the steps of the method. The system can be, for example, a search system 214 or another search system.

The system identifies an increase in popularity for a first query (step 1502). The system can identify an increase in popularity for the first query, for example, as described above with reference to FIG. 1. In general, the system will identify a current increase in popularity for a first query, or a recent increase in popularity for the first query. For example, the system can identify that the query had an increase in popularity over the past few minutes, the past hour, or over the past day.

The system identifies a second query as temporally related to the first query (step 1504). The system can identify the second query as temporally related to the first query using transition probabilities from the first query to a time and from the time to a second query, for example, as described above with reference to FIG. 14.

The system modifies scoring data for one or more documents responsive to the search query to favor newer documents responsive to the second query (step 1506). The newer documents can be, for example, documents that were recently modified or documents that were recently added to the corpus of documents. The system can modify the scoring data to favor newer documents responsive to the second query, for example, by discounting scoring data for the second query that measures historical relevance of the documents in the search history data to the second query. Examples of scoring data that measure the historical relevance of a document are discussed above with reference to FIG. 14. In some implementations, the system permanently modifies the scoring data. In alternative implementations, the system temporarily modifies the scoring data, for example, by making a copy of the scoring data, modifying the copy, and providing the modified copy to a document ranking process, or by providing the scoring data and a weight for the scoring data to the ranking process, which then weights the data appropriately.

Once the second query has been identified, the system can use the modified scoring data in place of the old scoring data to score search results responsive to the query.

Figure 16:
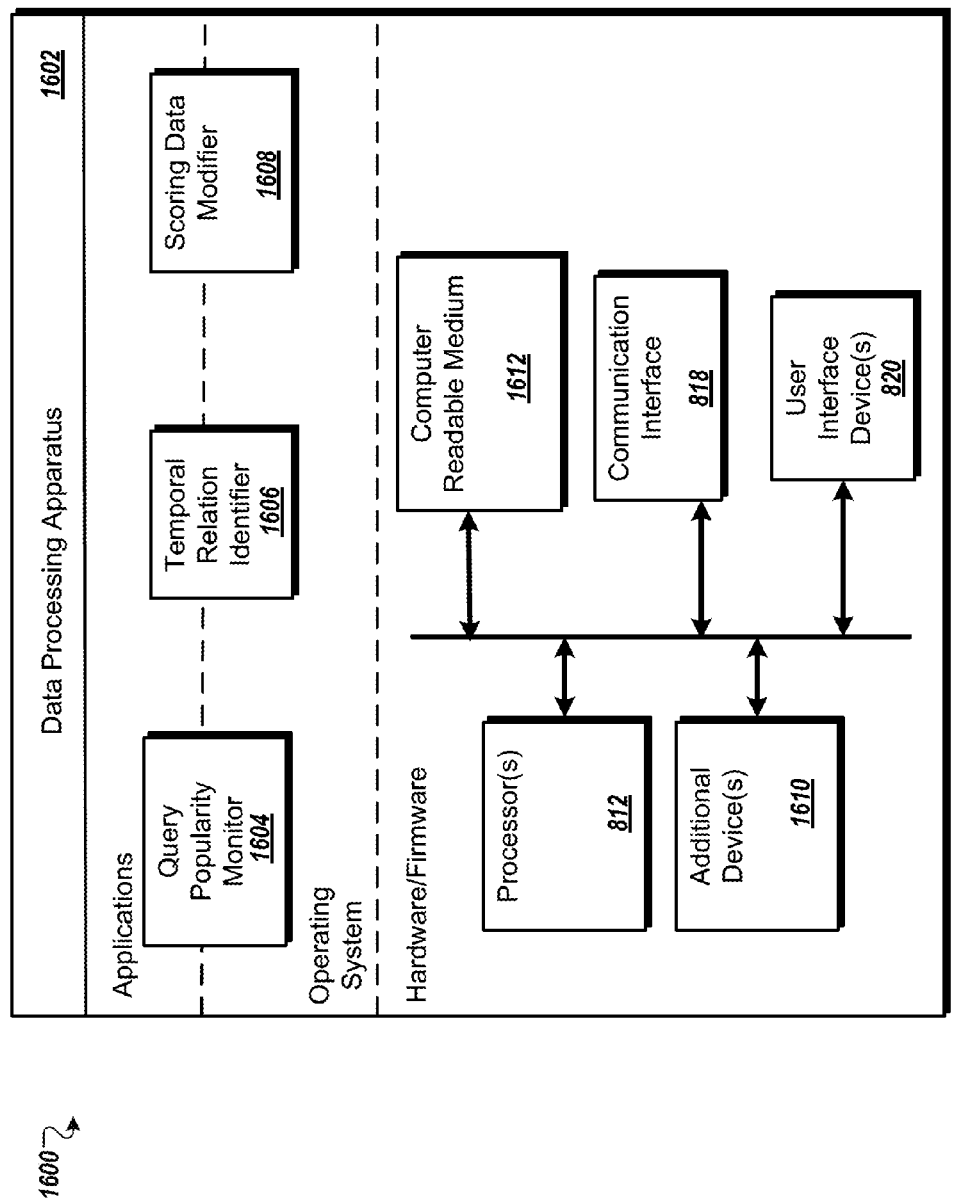
FIG. 16 illustrates an example architecture of a system that performs the method illustrated in FIG. 15.

FIG. 16 illustrates an example architecture of a system 1600. The system generally consists of a data processing apparatus 1602. While only one data processing apparatus is shown in FIG. 16, multiple data processing apparatus can be used.

The data processing apparatus 1602 includes various modules, e.g. executable software programs, including a query popularity monitor 1604, a temporal relation identifier 1606, and a scoring data modifier 1608. Each module runs, for example, as part of an operating system on the server, runs as one or more applications on the server, or runs as part of the operating system and part of one or more applications on the server. The query popularity monitor 1604 identifies increases in popularity for a query, for example, as described above with reference to FIG. 15. The temporal relation identifier 1606 identifies queries that are temporally related, for example, as described above with reference to FIGS. 14 and 15. The scoring data modifier 1608 modifies the scoring data for a given query, for example, as described above with reference to FIG. 15. The modules can be combined or subdivided differently than shown in FIG. 16.

The data processing apparatus 1602 can also have hardware or firmware devices including one or more processors 812, a communication interface 818, and one or more user interface devices 820. These devices are described above with reference to FIG. 8.

The data processing apparatus 1602 can store instructions that implement operations associated with the modules described above, for example, on a computer readable medium 1612 or one or more additional devices 1610, for example, one or more of a floppy disk device, a hard disk device, an optical disk device, or a tape device. In some implementations, the data processing apparatus 1602 also stores one or more of transition matrices, search history data, scoring data, or other data on the computer readable medium 1612 or on one or more additional devices 1610.

Figure 17:
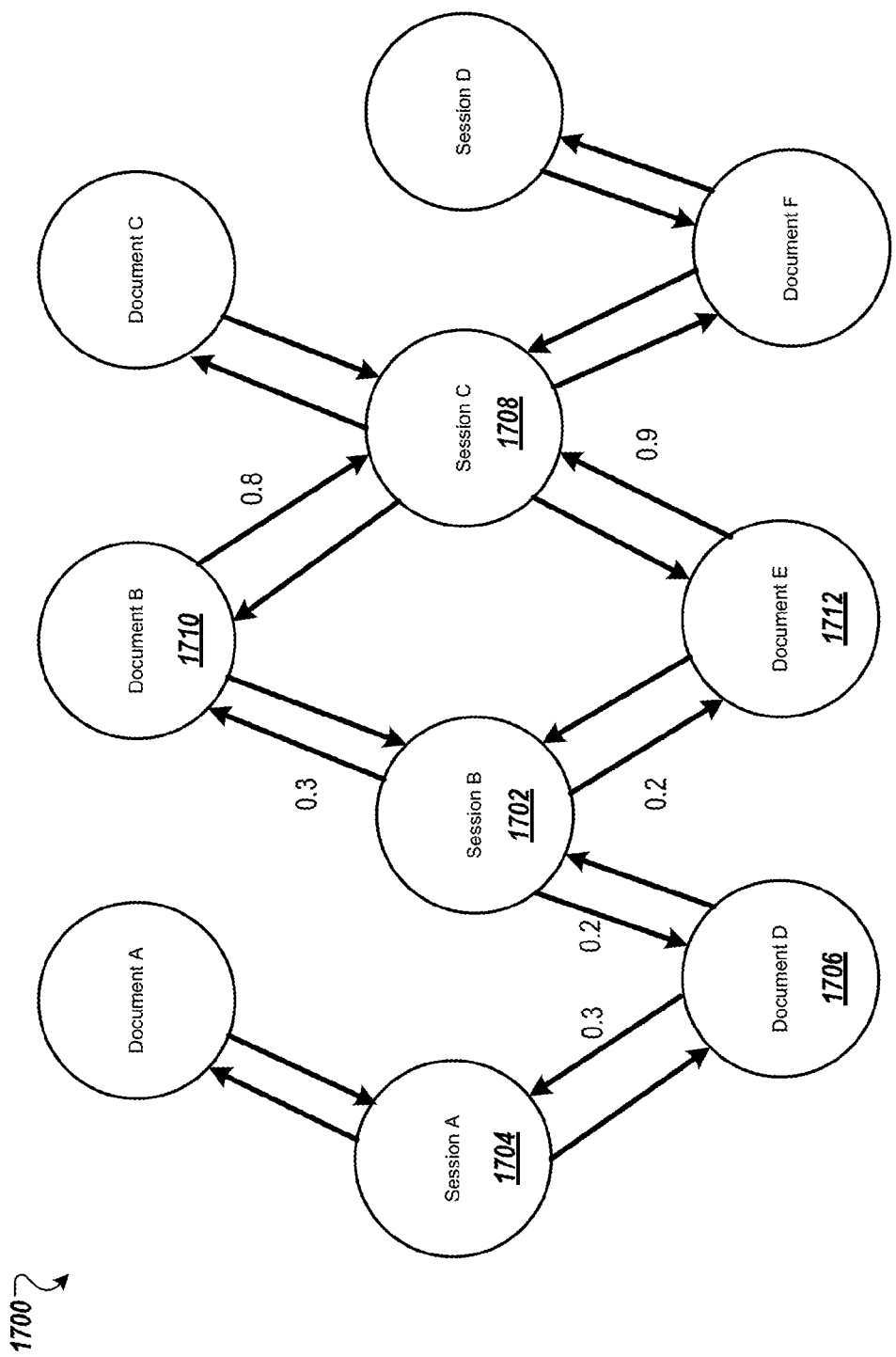
FIG. 17 is a graph illustrating example transition probabilities between sessions and documents.

FIG. 17 is a graph 1700 illustrating example transition probabilities between sessions and documents. The graph is a graphical representation of a transition matrix, such as the transition matrices described above with reference to FIG. 4. The transitions illustrated in FIG. 17 can be used by a system, for example, a search system, to identify related sessions from the documents viewed during the sessions. While the examples below focus on multiplying individual transition probabilities identified from the graph, the same effect can be achieved for all nodes in the graph by multiplying transition matrices storing data corresponding to the relevant transitions.

The transition probabilities illustrated in the graph 1700 can be used to calculate transition probabilities between two sessions. For example, the system can calculate the transition probability between session B 1702 and session A 1704 by multiplying the transition probability from session B 1702 to document D 1706 by the transition probability from document D 1706 to session A 1704 (i.e., 0.2 times 0.3, or 0.06). When two sessions are connected through multiple documents, the system can calculate the transition probability by calculating the transition probability between the sessions through each document, and then taking the sum of the transition probabilities. For example, the system can calculate the transition probability from session B 1702 to session C 1708 through document B 1710 by multiplying the transition probability from session B 1702 to document B 1710 by the transition probability from document B 1710 to session C 1708, multiplying the transition probability from session B 1702 to document E 1712 by the transition probability from document E 1712 to session C 1708, and then taking the sum of the two products.

The system can then identify sessions that are related based on the transition probabilities. For example, the system can determine that two sessions are related if the transition probability from one session to the other exceeds a threshold. The threshold can be, for example, an absolute number, or determined based on the transition probabilities for the sessions being compared. The system can use the relationships between sessions, for example, to identify other spam sessions related to a given session that is known (or believed) to be spam.

Figure 18:
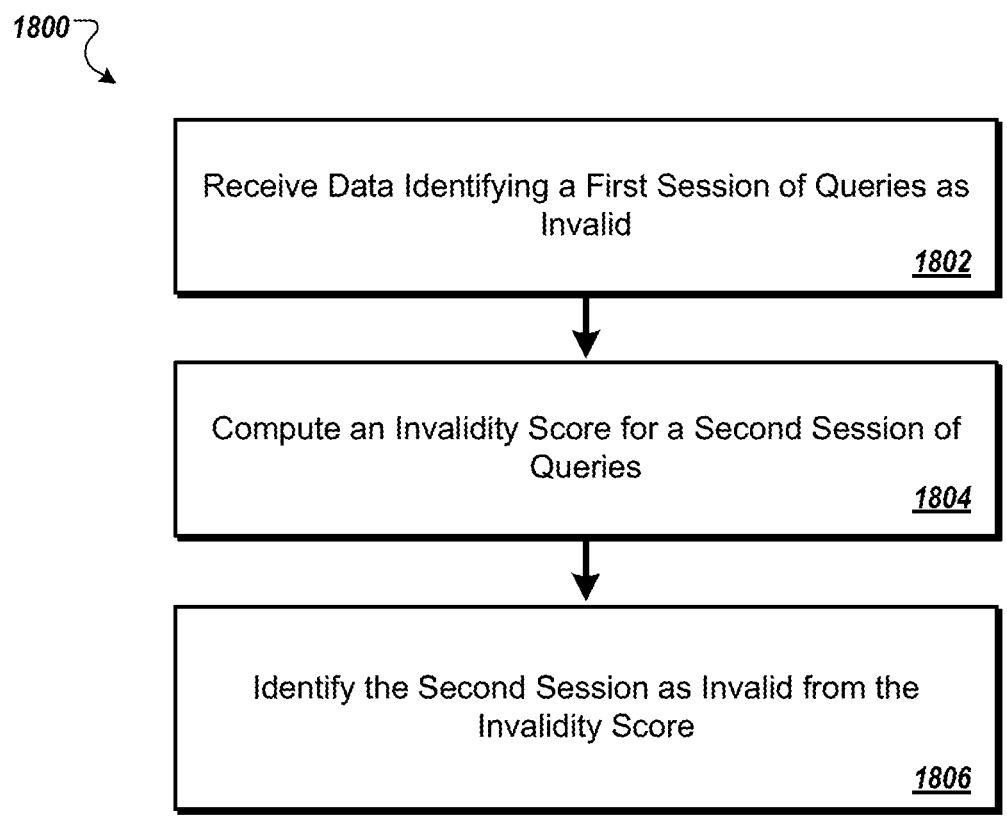
FIG. 18 illustrates an example method for identifying a second spam session from a first spam session.

FIG. 18 illustrates an example method 1800 for identifying a second spam session from a first spam session. For convenience, the method 1800 will be described with reference to a system that performs the steps of the method. The system can be, for example, the search system 214 or another system.

The system receives data identifying a first session of queries as spam (step 1802). In general a spam session is a session where the queries entered by a user and the documents selected by the user may not reflect genuine user preferences. In some implementations, the data identifying the first session of queries as spam is received, for example, from a component of the system (or a component external to the system) that modifies sessions of queries and identifies spam sessions based, for example, on the queries issued and the documents selected during each session.

The system computes a spam score for a second session of queries (step 1804). The spam score is based on transition probabilities from the first session to one or more documents and transition probabilities from the one or more documents to the second session. The spam score can be, for example, the session-to-session transition probability described above with reference to FIG. 17, or a value derived from the session-to-session transition probability.

The system identifies the second session as spam from the spam score (step 1806). The system can identify the second session as spam if the spam score satisfies a threshold. The threshold can be determined, for example, empirically.

In some implementations, when the system identifies the second session as spam, the system can use the second session to identify other sessions as spam, for example, by repeating the method 1800 using the identified second session as the first session. In some implementations, when the system identifies the second session as spam, the system can further discount the weight given to scoring data from the second session, for example, by scaling the scoring data by a factor. The factor can be absolute (e.g., 0, 0.5, 0.8, etc.) or can be based on the spam score between the two sessions. For example, the factor can be 1 minus the spam score.

Figure 19:
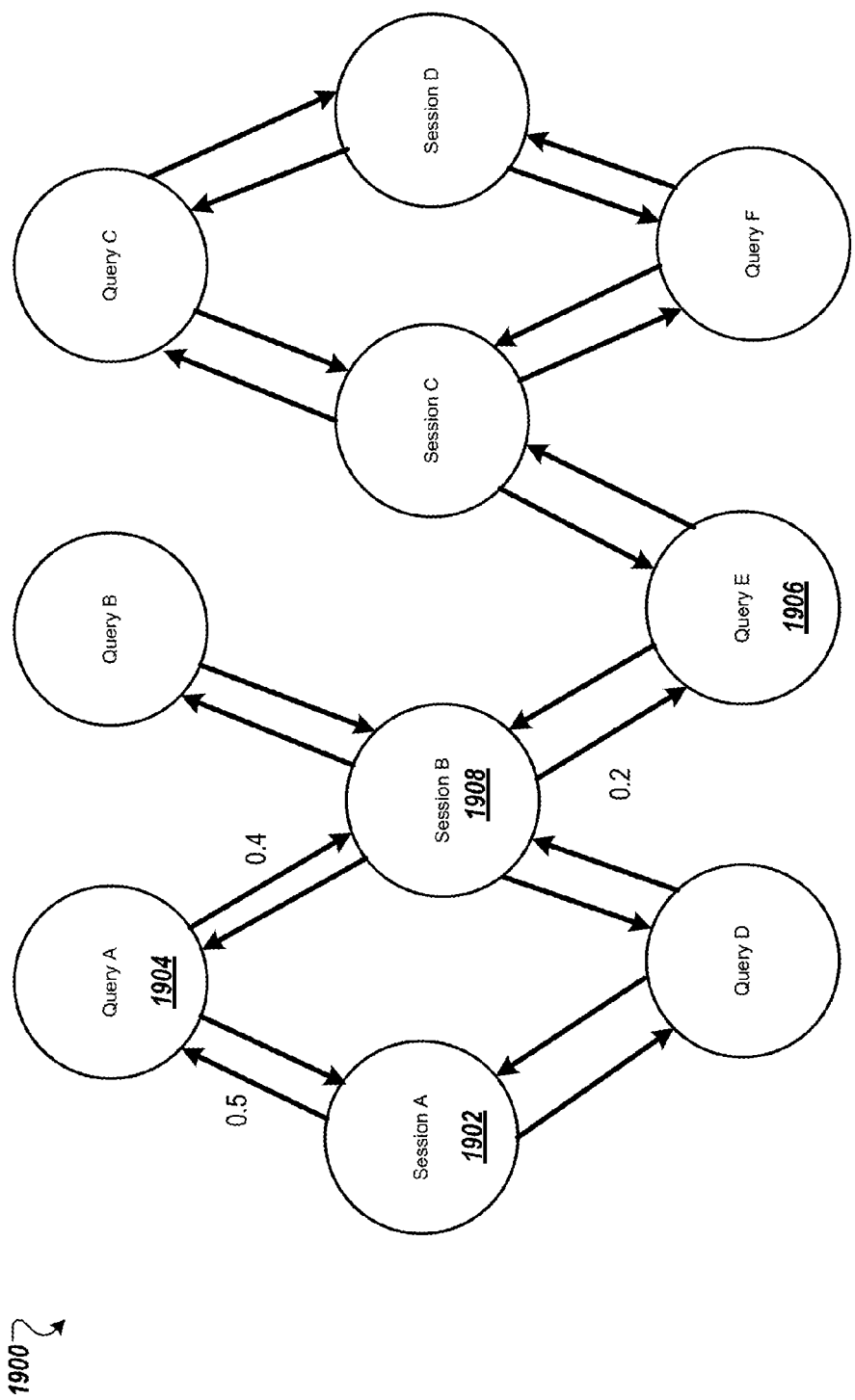
FIG. 19 is a graph illustrating example transition probabilities between sessions and queries.

FIG. 19 is a graph 1900 illustrating example transition probabilities between sessions and queries. The transitions illustrated in FIG. 19 can be used by a system, for example, the search system 213 or another system, to identify related sessions from the queries submitted during the sessions and to identify queries related to sessions. The transition probabilities can be calculated, for example, as described above with reference to FIGS. 1 and 2. While the examples below focus on multiplying individual transition probabilities from the graph, the same effect can be achieved for all nodes in the graph by multiplying transition matrices with data corresponding to the relevant transitions.

The system can use the transitions shown in the graph 1900 to calculate query-based session-to-session transition probabilities, much as document-based transition probabilities between sessions are calculated using transition probabilities between sessions and documents and documents and sessions as described above with reference to FIG. 17. The transition probabilities calculated based on queries submitted during the sessions can be used in place of the transition probabilities calculated based on documents viewed during the sessions when detecting spam sessions, for example, using the method described above with reference to FIG. 18.

The system can also use the transitions shown in the graph 1900 to determine session-to-session transition probabilities. The session-to-query transition probabilities can be direct transition probabilities or can be calculated through a series of multiplications of session-to-query and query-to-session transition probabilities. Transition probabilities between a session and a query can also be determined using the transition probabilities illustrated in the graph 1900. For example, the transition probability between session A 1902 and query A 1904 is the weight of the edge between session A 1902 and query A 1904. As another example, the system can calculate the transition probability between session A 1902 and query E 1906 by multiplying the transition probability from session A 1902 to query A 1904 by the transition probability from query A 1904 to session B 1908 and the transition probability from session B 1908 to query E 1906.

The transition probabilities between sessions and queries can be used to identify relationships between sessions and queries (i.e., when a transition probability between a session and a query satisfies a threshold), and can be used to identify potentially spam queries (e.g., spam queries) from a session that has been identified as spam.

Figure 20:
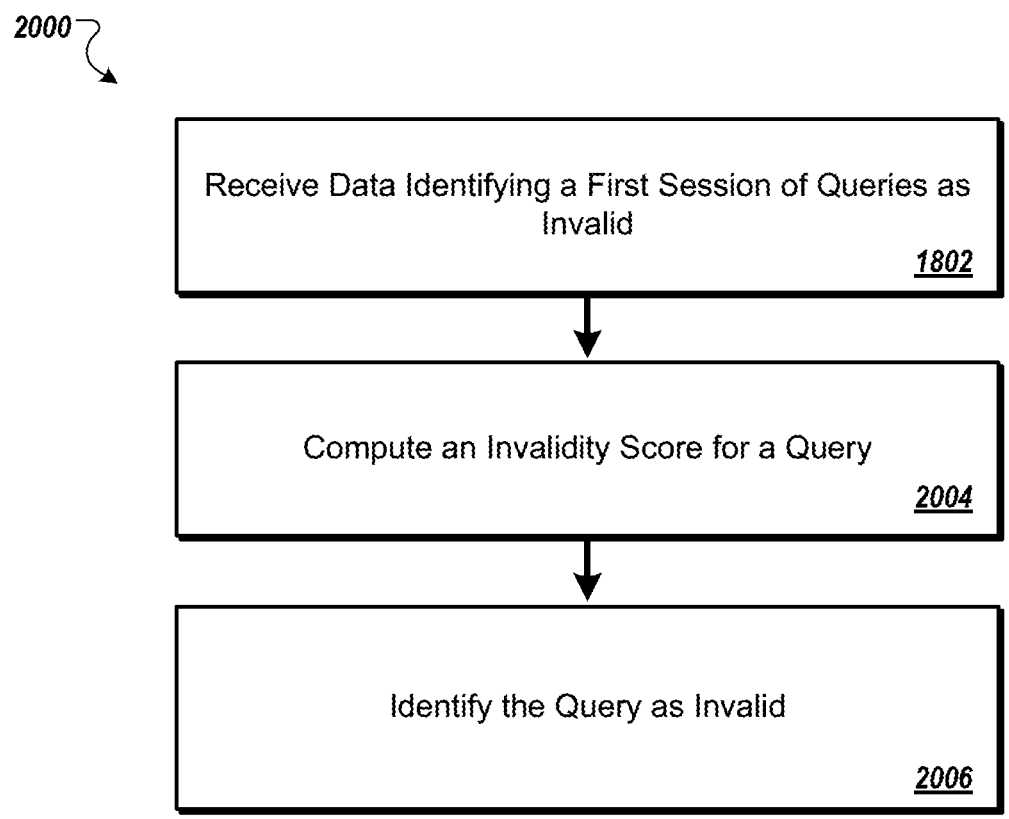
FIG. 20 illustrates an example method for identifying an spam query from an spam session.

FIG. 20 illustrates an example method 2000 for identifying an spam query from an spam session. For convenience, the method 2000 will be described with reference to a system that performs the steps of the method. The system can be, for example, a search system or another system.

The system receives data identifying a first session of queries as spam (step 1802). The system can receive the data, for example, as described above with reference to FIG. 18.

The system computes a spam score for a query (step 2004). The spam score can be, for example, the transition probability from the session to the query, or can be derived from the transition probability from the session to the query. The transition probability from the session to the query can be calculated, for example, as described above with reference to FIG. 19.

The system identifies the query as spam (step 2006). The system identifies the query as spam based on the spam score. For example, the system can identify the query as spam when the spam score satisfies a spam threshold. The spam threshold can be empirically determined, for example, based on an analysis of spam scores for queries known to be spam and queries known to be not spam. For example, the spam threshold can be selected so that it minimizes the error in the number of known non-spam queries identified as spam and the number of known spam queries identified as non-spam.

Once the system has identified the first query as spam, the system can use the identification in various ways. For example, the system can maintain an estimate of how many queries in a population of queries are spam, and can update that estimate based on the identification of the first query. The system can use the estimate of how many queries are spam, for example, to determine if the overall number of spam queries is increasing, or if the spam queries are staying in a small cluster of queries.

As another example, the system can identify a second session as spam based on a spam score from the first query to the second session, for example, by determining the spam score from the transition probability between the first query and the second session, and if the spam score satisfies a threshold, determining that the session is spam. Once the second session is identified as spam, the system can discount scoring data derived from the second session, for example, as described above with reference to FIG. 18.

As yet another example, the system can update scoring data for the first query and one or more documents by replacing the quality of result statistics in the scoring data for the first query and each document with modified quality of result statistics for the first query and each document. In some implementations, the modified quality of results statistics is calculated by scaling the quality of result statistics for the first query and each document by a factor derived from the spam score. In general, the more spam the first query, the more the quality of results statistics should be reduced. For example, if the spam score ranges from 0 to 1 and is higher when the query is more closely related to a spam session, the factor can be a constant (e.g., 1) minus the spam score. In alternative implementations, the factor is a constant and is not derived from the spam score. In some implementations, the factor is dampened, for example, to reduce the effect it has on the quality of result statistics. Other methods for generating the modified quality of results statistic are also possible.

Figure 21:
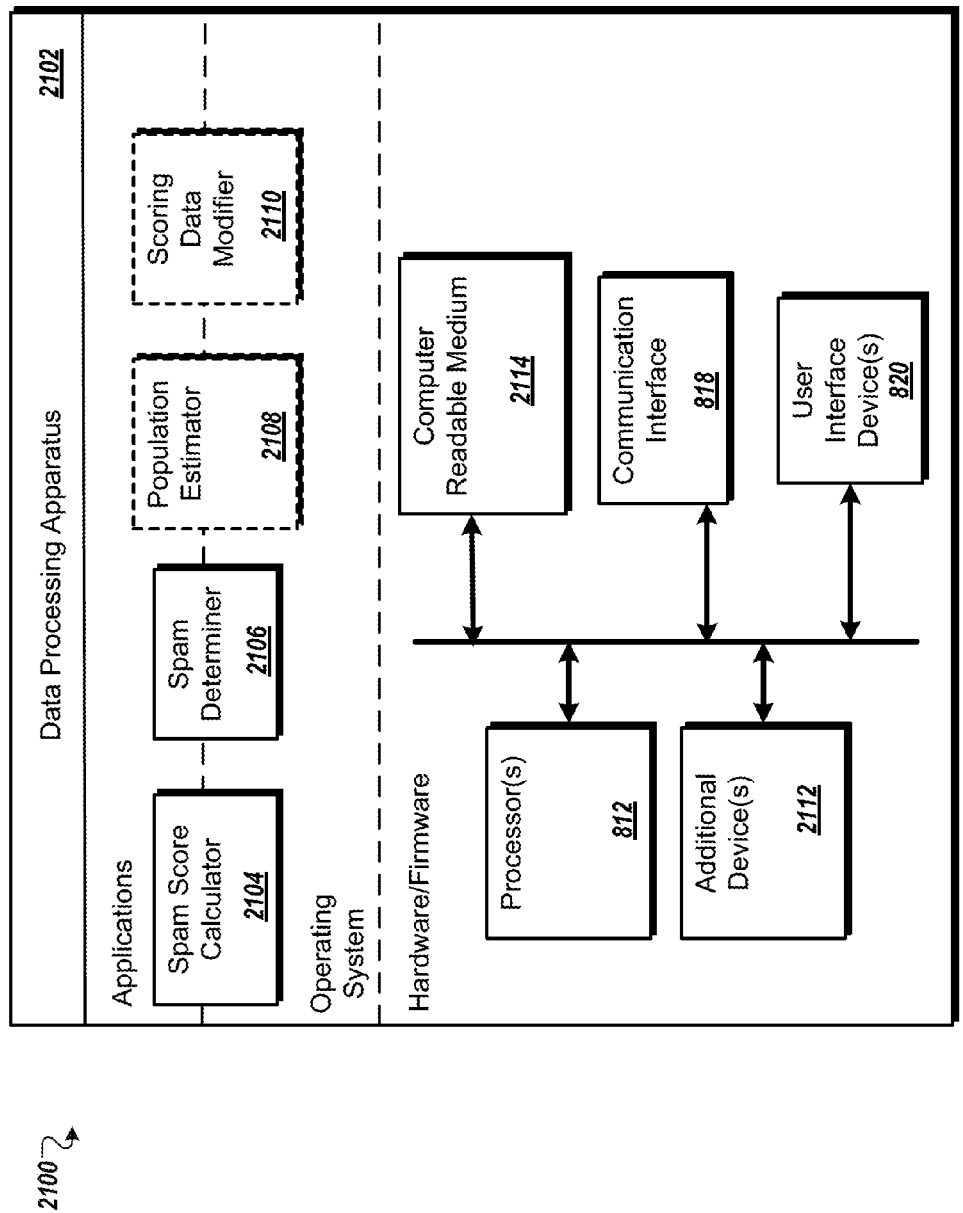
FIG. 21 illustrates an example illustrates an example architecture of a system that performs the methods illustrated in FIG. 18 and FIG. 20.

FIG. 21 illustrates an example illustrates an example architecture of a system 2100. The system generally consists of a data processing apparatus 2102. While only one data processing apparatus is shown in FIG. 21, multiple data processing apparatus can be used.

The data processing apparatus 2102 includes various modules, e.g. executable software programs, including a spam score calculator 2104, a spam determiner 2106, and can optionally include a population estimator 2108 and a scoring data modifier 2110. Each module, for example, runs as part of an operating system on the server, runs as one or more applications on the server, or runs as part of the operating system and part of one or more applications on the server. The spam score calculator 2104 calculates a spam score for a session or a query from a session that is known to be spam, for example, as described above with reference to FIGS. 18 and 20. The spam determiner 2106 determines whether a session or a query is spam based on a spam score, for example, as described above with reference to FIGS. 18 and 20. The optional population estimator 2108 estimates the number of spam queries in a population of queries, for example, as described above with reference to FIG. 20. The optional scoring data modifier 2110 modifies scoring data once a session or a query is determined to be spam, for example, as described above with reference to FIGS. 18 and 20. The modules can be combined or sub-divided differently than shown in FIG. 21.

The data processing apparatus 2102 can also have hardware or firmware devices including one or more processors 812, a communication interface 818, and one or more user interface devices 820. These devices are described above with reference to FIG. 8.

The data processing apparatus 2102 can store instructions that implement operations associated with the modules described above, for example, on a computer readable medium 2114 or one or more additional devices 2112. In some implementations, the data processing apparatus 2102 also stores one or more of transition matrices, search history data, scoring data, or other data on the computer readable medium 2114 or on one or more additional devices 2112.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An article of manufacture, comprising:
    a computer readable medium; and
    instructions stored in the computer readable medium which, when executed by one or more computers, cause the one or more computers to perform operations comprising:
        obtaining data representing entities, each entity being a query, a document, a session of queries, a time, or a domain of a document;
        identifying a plurality of pairs of entities from a subset of the entities from search history data, where each pair is either:
            (1) (i) a query paired with (ii) another query, a document, a session of queries, or a time, or
            (2) (i) a document paired with (ii) a session of queries, or
            (3) two documents paired with each other, and where the plurality of pairs of entities comprise a first pair of entities that is a first document paired with a first session of queries and a second pair of entities that is a second session of queries paired with a second document;
        generating, for each pair of entities, using the search history data, a respective directed relationship having a respective strength value and connecting a first entity of the pair to a second entity of the pair; and
        determining, for any two entities that are directly or indirectly connected through directed relationships, a relevance score from strength values of the directed relationships connecting the two entities.

2. The article of manufacture of claim 1, wherein the plurality of pairs of entities comprises a first pair of entities, a first entity of the pair being a query connected to a second entity of the pair being a document, and wherein the strength value of the directed relationship from the query to the document is based on a quality of result statistic for the document as a search result for the query and quality of results statistics for documents in the search history data as search results for the query.

3. The article of manufacture of claim 2, wherein the strength value is calculated by dividing the quality of result statistic for the document as a search result for the query by the sum of quality results statistics for all documents in the search history data that are search results for the query.

4. The article of manufacture of claim 1, wherein the plurality of pairs of entities comprises a first pair of entities, a first entity of the first pair being a document connected to a second entity of the first pair being a query, and wherein the strength value of the directed relationship from the document to the query is based on a quality of result statistic for the document as a search result for the query and quality of results statistics for the document as a search result for queries in search history data.

5. The article of manufacture of claim 4, wherein the strength value is calculated by dividing the quality of result statistic for the document as a search result for the query by the sum of quality results statistics for the document and all of the queries in the search history data for which the document is a search result.

6. The article of manufacture of claim 1, wherein the strength value of the directed relationship from the first document to the first session of queries in the first pair of entities is based on how many documents are viewed during the first session and whether the first document is viewed during the first session, and
    wherein the strength value of the directed relationship from the second session of queries to the second document in the second pair of entities is based on how many sessions the second document was viewed in and whether the second document is viewed during the second session.

7. The article of manufacture of claim 1, the plurality of pairs of entities comprises a first pair of entities, a first entity of the pair being a first document connected to a second entity of the pair being a second distinct document, and wherein the strength value of the directed relationship from the first document to the second is based on whether the first document includes an anchor pointing to the second document.

8. The article of manufacture of claim 1, where each pair comprises (1) a first directed relationship having a first strength value connecting a first entity in the pair to a second entity in the pair, or (2) a first directed relationship having a first strength value connecting the first entity to the second entity and a second directed relationship having a second strength value connecting the second entity to the first entity.

9. A method comprising:
    obtaining data representing entities, each entity being a query, a document, a session of queries, a time, or a domain of a document;
    identifying a plurality of pairs of entities from a subset of the entities from search history data, where each pair is either:
        (1) (i) a query paired with (ii) another query, a document, a session of queries, or a time, or
        (2) (i) a document paired with (ii) a session of queries, or
        (3) two documents paired with each other, and where the plurality of pairs of entities comprise a first pair of entities that is a first document paired with a first session of queries and a second pair of entities that is a second session of queries paired with a second document;
    generating, for each pair of entities, using the search history data, a respective directed relationship having a respective strength value and connecting a first entity of the pair to a second entity of the pair; and
    determining, for any two entities that are directly or indirectly connected through directed relationships, a relevance score from strength values of the directed relationships connecting the two.

10. The method of claim 9, wherein the plurality of pairs of entities comprises a first pair of entities, a first entity of the pair being a query connected to a second entity of the pair being a document, and wherein the strength value of the directed relationship from the query to the document is based on a quality of result statistic for the document as a search result for the query and quality of results statistics for documents in the search history data as search results for the query.

11. The method of claim 10, wherein the strength value is calculated by dividing the quality of result statistic for the document as a search result for the query by a sum of quality results statistics for all documents in the search history data that are search results for the query.

12. The method of claim 9, wherein the plurality of pairs of entities comprises a first pair of entities, a first entity of the first pair being a document connected to a second entity of the first pair being a query, and wherein the strength value of the directed relationship from the document to the query is based on a quality of result statistic for the document as a search result for the query and quality of results statistics for the document as a search result for queries in search history data.

13. The method of claim 12, wherein the strength value is calculated by dividing the quality of result statistic for the document as a search result for the query by a sum of quality results statistics for the document and all of the queries in the search history data for which the document is a search result.

14. The method of claim 9, wherein the strength value of the directed relationship from the first document to the first session of queries in the first pair of entities is based on how many documents are viewed during the first session and whether the first document is viewed during the first session, and wherein the strength value of the directed relationship from the second session of queries to the second document in the second pair of entities is based on how many sessions the second document was viewed in and whether the second document is viewed during the second session.

15. The method of claim 9, wherein the plurality of pairs of entities comprises a first pair of entities, a first entity of the pair being a first document connected to a second entity of the pair being a second distinct document, and wherein the strength value of the directed relationship from the first document to the second is based on whether the first document includes an anchor pointing to the second document.

16. The method of claim 9, where each pair comprises (1) a first directed relationship having a first strength value connecting a first entity in the pair to a second entity in the pair, or (2) a first directed relationship having a first strength value connecting the first entity to the second entity and a second directed relationship having a second strength value connecting the second entity to the first entity.

\* \* \* \* \*